US 6,636,479 B1

(12) United States Patent
Chikamatsu et al.

(10) Patent No.: US 6,636,479 B1
(45) Date of Patent: Oct. 21, 2003

(54) COMMUNICATION UNIT HAVING PACKET MULTIPLEXING FUNCTION

(75) Inventors: Yuichiro Chikamatsu, Kawasaki (JP); Hideo Abe, Yokohama (JP); Yasuo Tezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/363,358

(22) Filed: Jul. 29, 1999

(30) Foreign Application Priority Data

Oct. 28, 1998 (JP) .......................................... 10-306467

(51) Int. Cl.$^7$ .............................................. H04L 12/28
(52) U.S. Cl. .................... 370/229; 370/392; 370/395.4; 370/395.52; 709/227
(58) Field of Search ................................. 370/229, 230, 370/235, 392, 395.1, 395.4, 395.41, 395.42, 395.5, 395.51, 395.52, 395.53, 464, 465, 466, 467, 468, 469, 474; 709/227, 228, 230

(56) References Cited

U.S. PATENT DOCUMENTS

| 4,688,214 A | * | 8/1987 | DeWitt et al. ............... 370/389 |
| 5,058,110 A | * | 10/1991 | Beach et al. ................. 370/464 |
| 5,509,121 A | * | 4/1996 | Nakata et al. ............... 709/230 |
| 5,517,620 A | * | 5/1996 | Hashimoto et al. .......... 370/389 |
| 6,028,843 A | * | 2/2000 | Delp et al. ................... 370/235 |
| 6,052,368 A | * | 4/2000 | Aybay ......................... 370/357 |

FOREIGN PATENT DOCUMENTS

| JP | 7-15461 | 1/1995 | ........... H04L/12/28 |
| JP | 10-79740 | 3/1998 | ........... H04L/12/28 |

* cited by examiner

*Primary Examiner*—Dang Ton
*Assistant Examiner*—Shick Hom
(74) *Attorney, Agent, or Firm*—Katten Muchin Zavis Rosenman

(57) ABSTRACT

A communication unit which transmits packets in the form of ATM cells, includes a packet buffer part receiving Virtual Channel (VC)-multiplexed ATM cells from an input line, judging a packet type, converting a header and assembling a packet, a protocol processing part receiving and processing a protocol packet output from the packet buffer part when the packet type of the packet assembled in the packet buffer part is the protocol packet which is used for communication control, and a packet output scheduling part, including a scheduler which carries out an arbitration when an output request generated upon completion of a reception of a user packet from the packet buffer part and an output request generated upon ending of a process from the protocol processing part are received, and selects and outputs to an output line the user packet or the protocol packet based on the arbitration.

20 Claims, 15 Drawing Sheets

US 6,636,479 B1

COMMUNICATION UNIT HAVING PACKET MULTIPLEXING FUNCTION

BACKGROUND OF THE INVENTION

1. Field of the Invention

The present invention generally relates to communication units, and more particularly to a communication unit which transmits packets in the form of Asynchronous Transfer Mode (ATM) cells.

Recently, communication systems which transmit data at a high speed in the form of packets, are widely used. On the other hand, networks are being realized which treat ATM cells conforming to the ATM which transmits information such as data at the high speed. In data transmission using the ATM cells, multiplexing is carried out for each Virtual Channel (VC), and for this reason, it is possible to efficiently utilize the transmission channel.

However, in a node or server which carries out a transmission control, it takes time to process, by a software process, the ATM cells which are multiplexed and form packets for controlling the protocol or the like. As a result, unused slots are introduced on the line, and there are demands to improve the operation efficiency of the line.

2. Description of the Related Art

FIG. 1 is a diagram for explaining an example of a conventional communication unit. More particularly, FIG. 1 shows the construction of a node or server within an ATM network. The node or server includes a Cell Assembly and Disassembly (CLAD) and Direct Memory Access Control (DMAC) part 80, a buffer memory 81, a Central Processing Unit (CPU) 82, and a gate 83.

In the conventional ATM network, a packet of user information from a terminal (not shown) accommodated in each node is transmitted in the form of ATM cells respectively made up of a 5-byte header and a 48-byte information part. A large number of such packets of the user information, that is, user packets, are transmitted in the form of multiplexed ATM cells, and each user packet is distinguished by a Virtual Channel (VC) which is set in the header. In addition, protocol packets are transmitted on the line in the form of the multiplexed ATM cells together with the user packets. The protocol packets are packet information for controlling the protocol, and are used to control transmissions in the network.

The ATM cells of the user packets and the protocol packets are input to the CLAD and DMAC part 80 from an input line. In this particular example, the user packet is transmitted in the form of 2 kinds of ATM cells ① and ② respectively having VCs 100 and 101, and the protocol packet is transmitted in the form of ATM cells ③ having a VC 10. A plurality of such ATM cells ①, ATM cells ② and ATM cells ③ are multiplexed and transmitted. When the plurality of kinds of ATM cells ①, ② and ③ are multiplexed and input to the CLAD and DMAC part 80 via the input line, the following processes A, B and C are carried out in this sequence.

Process A: The CLAD and DMAC part 80 identifies the VC in the header of each ATM cell, and sequentially stores, by a DMA transfer, the 48-byte information parts which are deleted of the headers of the ATM cells in corresponding regions of the buffer memory 81 for each of the VCs, so that the original packets can be assembled.

Process B: The assembled packets in the buffer memory 81 are processed by a software processing of the CPU 82, in a sequence starting from the packet the assembly of which is completed. The software processing in this case mainly processes the transfer control with respect to the protocol packet.

Process C: After the software processing ends, a DMA transfer is carried out and a cell header is thereafter added to output the ATM cells to an output line. In this particular case, 3 ATM cells forming the protocol packet ② having the VC 10 are sequentially transmitted, and after a predetermined time corresponding to the software processing, 2 ATM cells forming the user packet ① having the VC 100 are sequentially transmitted, followed by 2 ATM cells forming the user packet ③ having the VC 101.

As described above, the packets are processed by the software processing, and the output is thereafter made for each of the packets. As a result, a large amount of empty cell spaces, that is, gaps, are formed between the packets which are output, and there is a problem in that the line cannot be utilized efficiently. In addition, because of the limit in the processing speed of the software processing, there are problems in that the increase in the line speed and capacity is limited thereby.

SUMMARY OF THE INVENTION

Accordingly, it is a general object of the present invention to provide a novel and useful communication unit in which the problems described above are eliminated.

Another and more specific object of the present invention is to provide a communication unit which transmits packets in the form of ATM cells by multiplexing VCs, so as to be unaffected by effects of a software processing of protocol packets, and to realize a high-speed transmission and a large capacity of a line without introducing gaps on the line.

Still another object of the present invention is to provide an apparatus comprising a packet buffer receiving Virtual Channel (VC)-multiplexed ATM packets from an input line, judging a packet type, converting a header and assembling a packet, a protocol processor receiving and processing a protocol packet output from the packet buffer when the packet type of the packet assembled in the packet buffer is the protocol packet, and a packet output scheduler which carries out an arbitration in response to a reception of a user packet from the packet buffer and an ending of a process from the protocol processor, and selects and outputs to an output line the user packet or the protocol packet based on the arbitration. According to the apparatus of the present invention, it is possible to carry out the processes of forming the packet from the cells, converting the header and processing the protocol at a high speed, and also sufficiently utilize the line rate. For this reason, the present invention is particularly effective when applied to a unit which is used in an internet network in which large amounts of header conversion and protocol processings are made and the data are exchanged in units of packets. Thus, the present invention can cope with the continuously increasing internet demands, and increase the speed of the line as well as enable efficient use of the line.

A further object of the present invention is to provide a communication unit which transmits packets in the form of ATM cells, comprising a packet buffer part receiving Virtual Channel (VC)-multiplexed ATM cells from an input line, judging a packet type, converting a header and assembling a packet, a protocol processing part receiving and processing a protocol packet output from the packet buffer part when the packet type of the packet assembled in the packet buffer part is the protocol packet which is used for communication control, and a packet output scheduling part, including a scheduler which carries out an arbitration when an output request generated upon completion of a reception of a user packet from the packet buffer part and an output request generated upon ending of a process from the protocol processing part are received, and selects and outputs to an output line the user packet or the protocol packet based on the arbitration. According to the communication unit of the present invention, it is possible to carry out the processes of forming the packet from the cells, converting the header and processing the protocol at a high speed, and also sufficiently utilize the line rate. For this reason, the present invention is particularly effective when applied to a unit which is used in an internet network in which large amounts of header conversion and protocol processings are made and the data are exchanged in units of packets. Thus, the present invention can cope with the continuously increasing internet demands, and increase the speed of the line as well as enable efficient use of the line.

Another object of the present invention is to provide a communication unit which transmits packets in the form of ATM cells, comprising a packet buffer part receiving Virtual Channel (VC)-multiplexed ATM cells from an input line, a packet output scheduling part having a scheduler, and a protocol processing part, where the packet buffer part includes a packet type judging part judging a packet type of the received ATM cells, first and second packet assembling parts assembling a packet from the received ATM cells, first and second packet buffer parts, and first and second packet output parts, the first packet assembling part, the first packet buffer part and the first packet output part are provided with respect to a protocol packet, the second packet assembling part, the second packet buffer part and the second packet output part are provided with respect to a user packet, the first packet output part outputs the protocol packet with respect to the protocol processing part, the second packet output part has an output arbitration part which carries out an arbitration between the scheduler of the packet output scheduling part and outputting the user packet to the packet output scheduling part, and the protocol processing part outputs the protocol packet to the packet output scheduling part when a software processing of the protocol packet ends. According to the communication unit of the present invention, it is possible to carry out the processes of forming the packet from the cells, converting the header and processing the protocol at a high speed, and also sufficiently utilize the line rate. For this reason, the present invention is particularly effective when applied to a unit which is used in an internet network in which large amounts of header conversion and protocol processings are made and the data are exchanged in units of packets. Thus, the present invention can cope with the continuously increasing internet demands, and increase the speed of the line as well as enable efficient use of the line.

Other objects and further features of the present invention will be apparent from the following detailed description when read in conjunction with the accompanying drawings.

DESCRIPTION OF THE PREFERRED EMBODIMENTS

Figure 1:
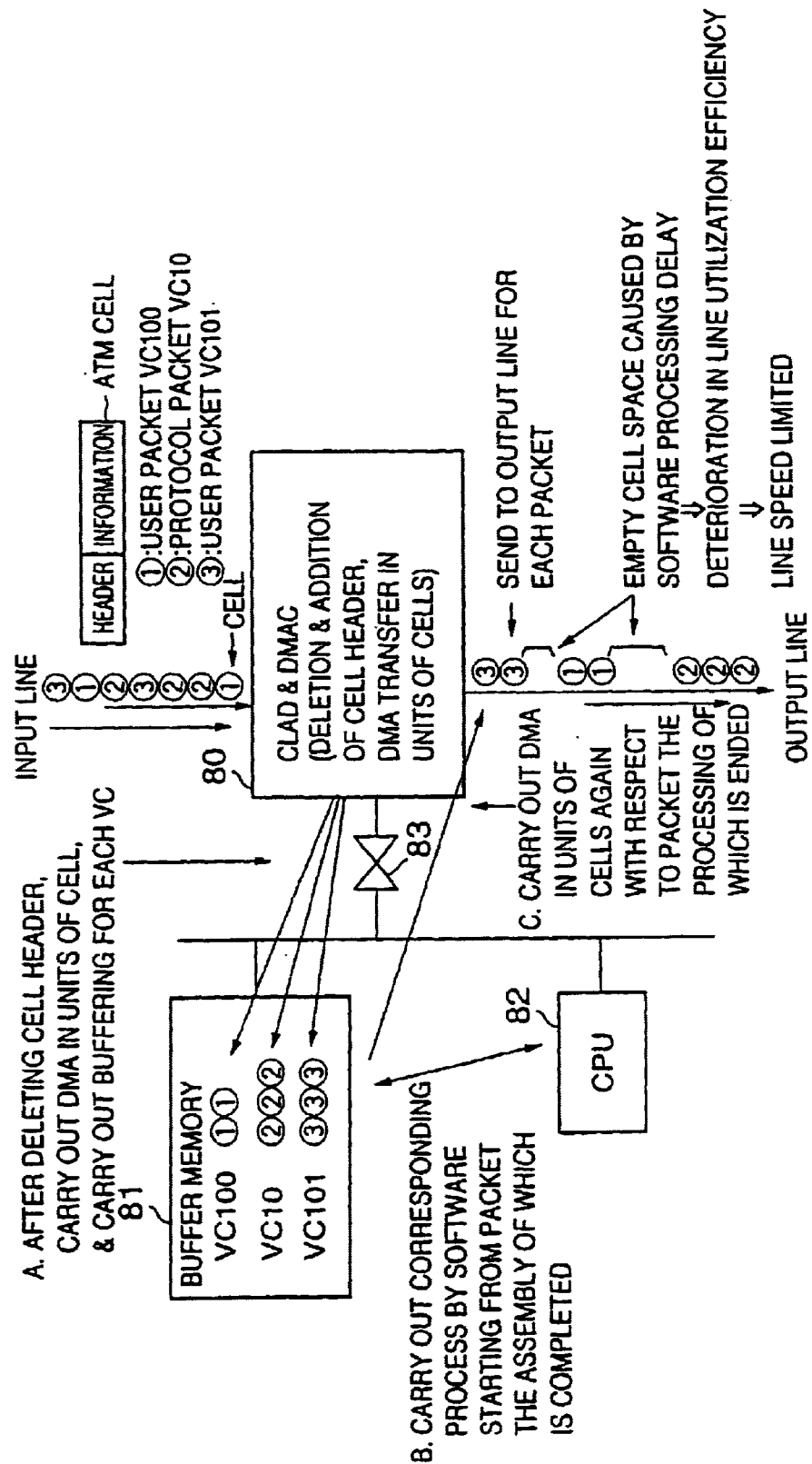
FIG. 1 is a diagram for explaining an example of a conventional communication unit.
Figure 2:
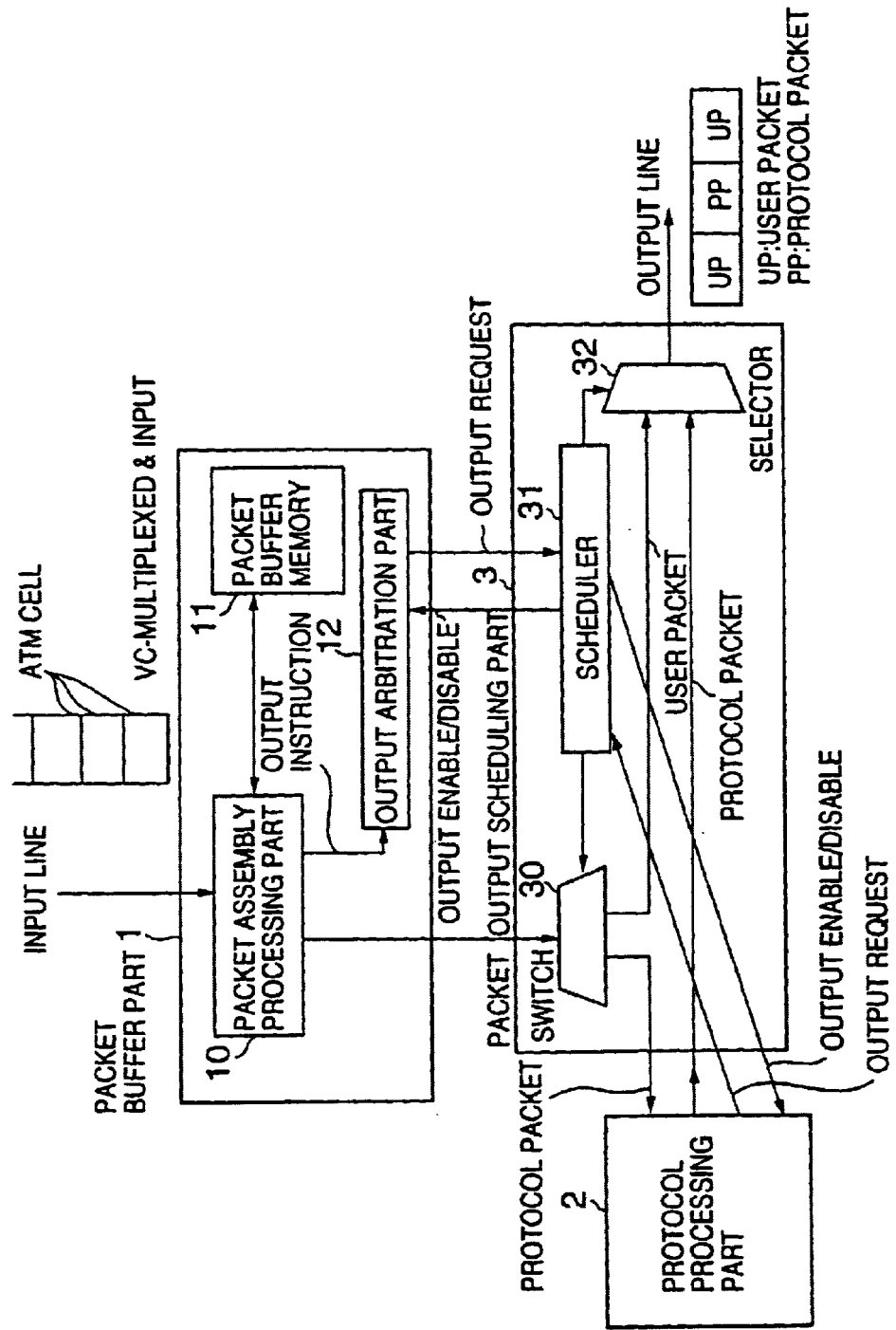
FIG. 2 is a system block diagram for explaining the operating principle of the present invention.

FIG. 2 is a system block diagram for explaining the operating principle of the present invention. More particularly, FIG. 1 shows an important part of a communication unit including a packet buffer part (or simply packet buffer) 1, a protocol processing part (or simply protocol processor) 2, and a packet output scheduling part (or simply packet output scheduler) 3.

The packet buffer part 1 stores packets for each of VCs and outputs the packets, by hardware. This packet buffer part 1 includes a packet assembly processing part 10, a packet buffer memory 11, and an output arbitration part 12. The packet assembly processing part 10 assembles ATM cells to form the packets, judges whether the ATM cells are user cells or protocol cells, and carries out a header conversion. On the other hand, the packet output scheduling part 3 includes a switch 30, a scheduler 31, and a selector 32.

When the ATM cells having the multiplexed VCs are input from an input line to the packet buffer part 1, the packet assembly processing part 10 carries out in parallel the processes of judging the kind of ATM cells, making the header conversion, and assembling the packets. Each of the ATM cells, including the header, is stored in the packet buffer memory 11 for each of the packets in correspondence with the VCs. In this case, each header is identified and converted into a new header corresponding to a next transmission channel, and is stored in the packet buffer memory 11. When the packet is completed in the packet buffer part 1 from the plurality of ATM cells, the packet is output to the protocol processing part 2 via the switch 30 of the output scheduling part 3 in the case of the protocol packet. On the other hand, when the completed packet is the user packet, a packet output request is output from the output arbitration part 12 with respect to the scheduler 31 of the packet output scheduling part 3, so as to receive an output enable or disable response. If the output enable response is received, the user packet is supplied to the switch 30 in the form of ATM cells with the header added thereto. The switch 30 is switched by the scheduler 31 and is connected to an output which inputs the ATM cells to the selector 32. The selector 32 is switched by the scheduler 31 to select the ATM cells output from the switch 30, and the ATM cells of the user packet are output to an output line.

The protocol processing part 2 carries out a software processing with respect to the protocol packet, and when the software processing ends, outputs the packet output request with respect to the scheduler 31 of the packet output scheduling part 3. When output enable response is returned in response to the packet output request, the protocol processing part 2 outputs the ATM cells of the processed protocol packet, and the ATM cells are transmitted to the output line via the selector 32 of the packet output scheduling part 3. Hence, the input packets are formed into ATM cells having the multiplexed VCs, and are output in the form of the ATM cells but in units of the packets.

Figure 3:
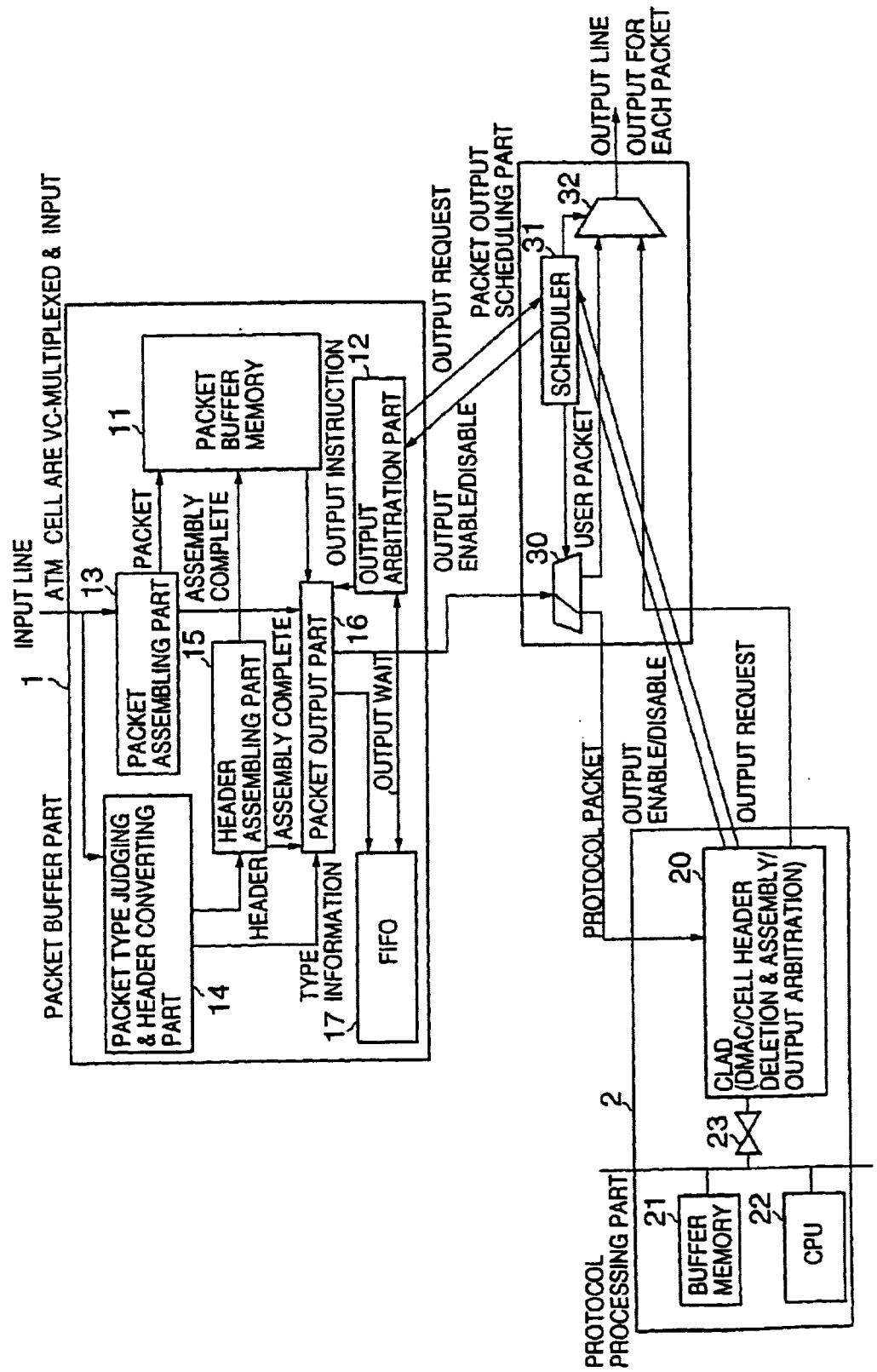
FIG. 3 is a system block diagram showing a first embodiment of a communication unit according to the present invention.

FIG. 3 is a system block diagram showing a first embodiment of the communication unit according to the present invention. In FIG. 3, those parts which are the same as those corresponding parts in FIG. 2 are designated by the same reference numerals, and a description thereof will be omitted.

A communication unit shown in FIG. 3 includes the packet buffer part 1, the protocol processing part 2, and the packet output scheduling part 3. The packet buffer part 1 includes the packet buffer memory 11, the output arbitration part 12, a packet assembling part 13, a packet type judging and header converting part 14, a header assembling part 15, a packet output part 16, and a First-In-First-Out (FIFO) memory 17 which stores a packet output wait queue. The packet assembling part 13, the packet type judging and header converting part 14, the header assembling part 15, the packet output part 16, and the FIFO memory 17 realize the functions of the packet assembly processing part 10 shown in FIG. 2.

The protocol processing part 2 includes a Cell Assembly and Disassembly (CLAD) part 20, a buffer memory 21, and a Central Processing Unit (CPU) 22. The CLAD part 20 includes the functions of DMAC, cell header deletion and assembly, and output arbitration. On the other hand, the packet output scheduling part 3 includes the switch 30, the scheduler 31 and the selector 32, as in the case shown in FIG. 2.

Figure 4:
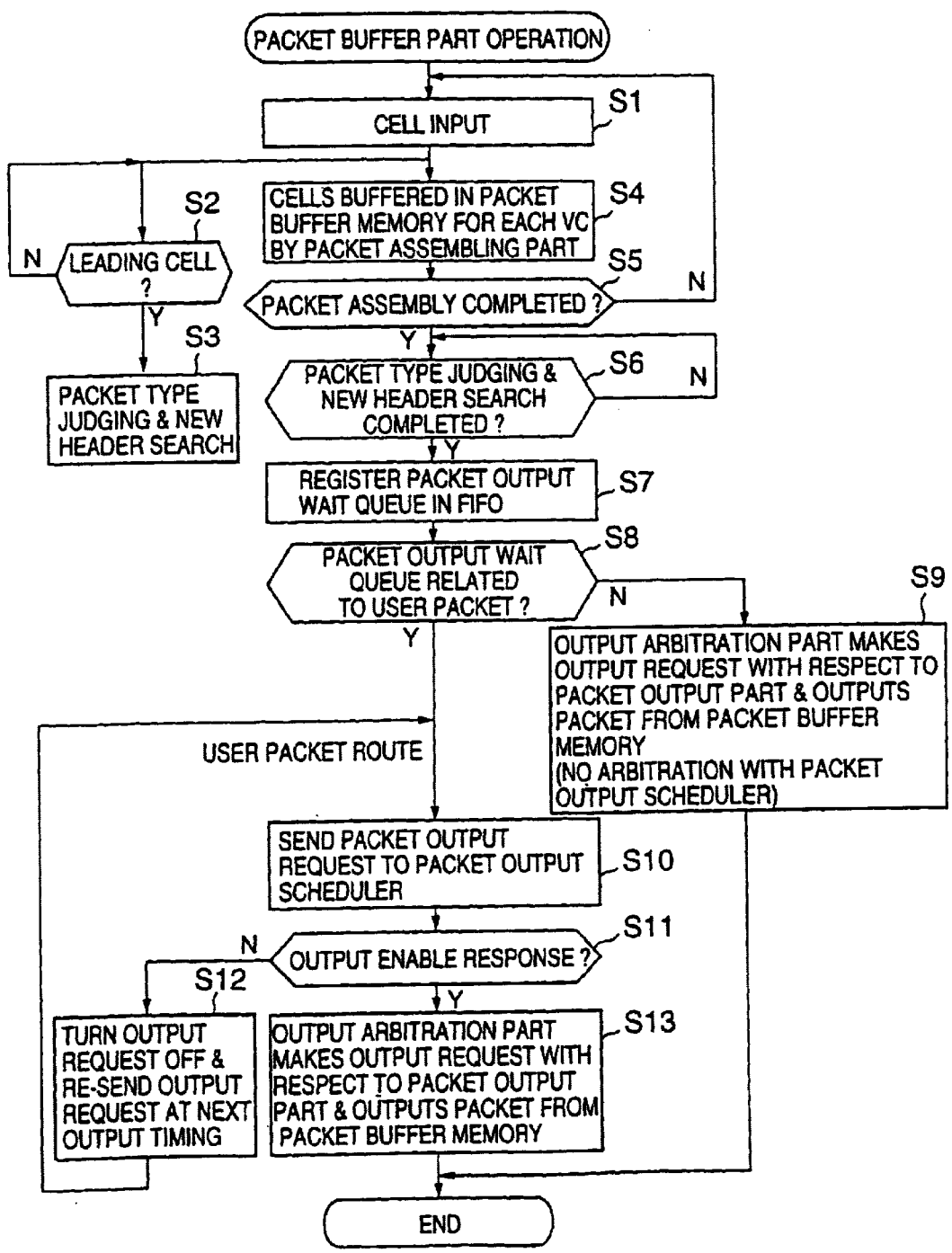
FIG. 4 is a flow chart for explaining the operation of a packet buffer part of the first embodiment.
Figure 5:
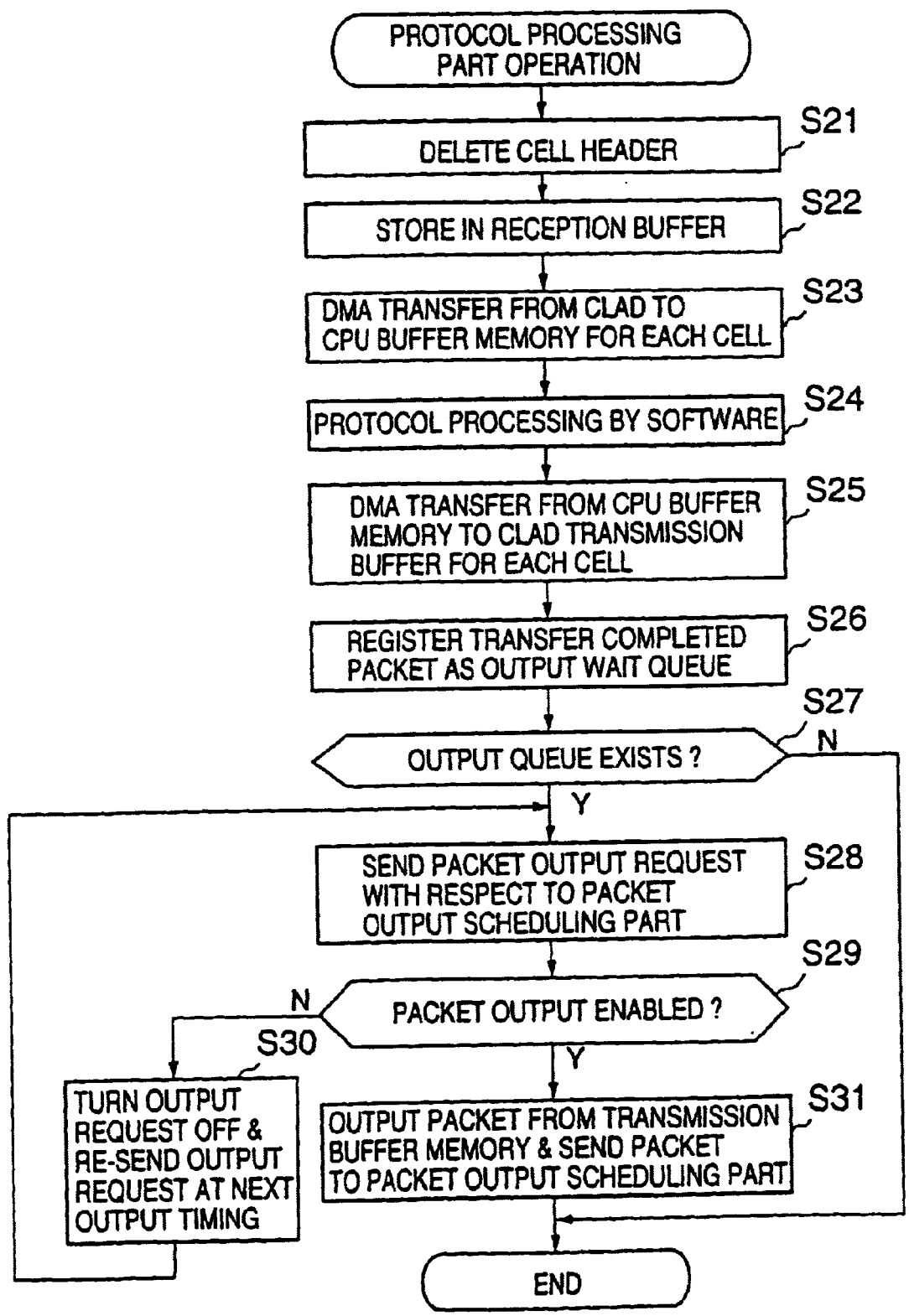
FIG. 5 is a flow chart for explaining the operation of a protocol processing part of the first embodiment.
Figure 6:
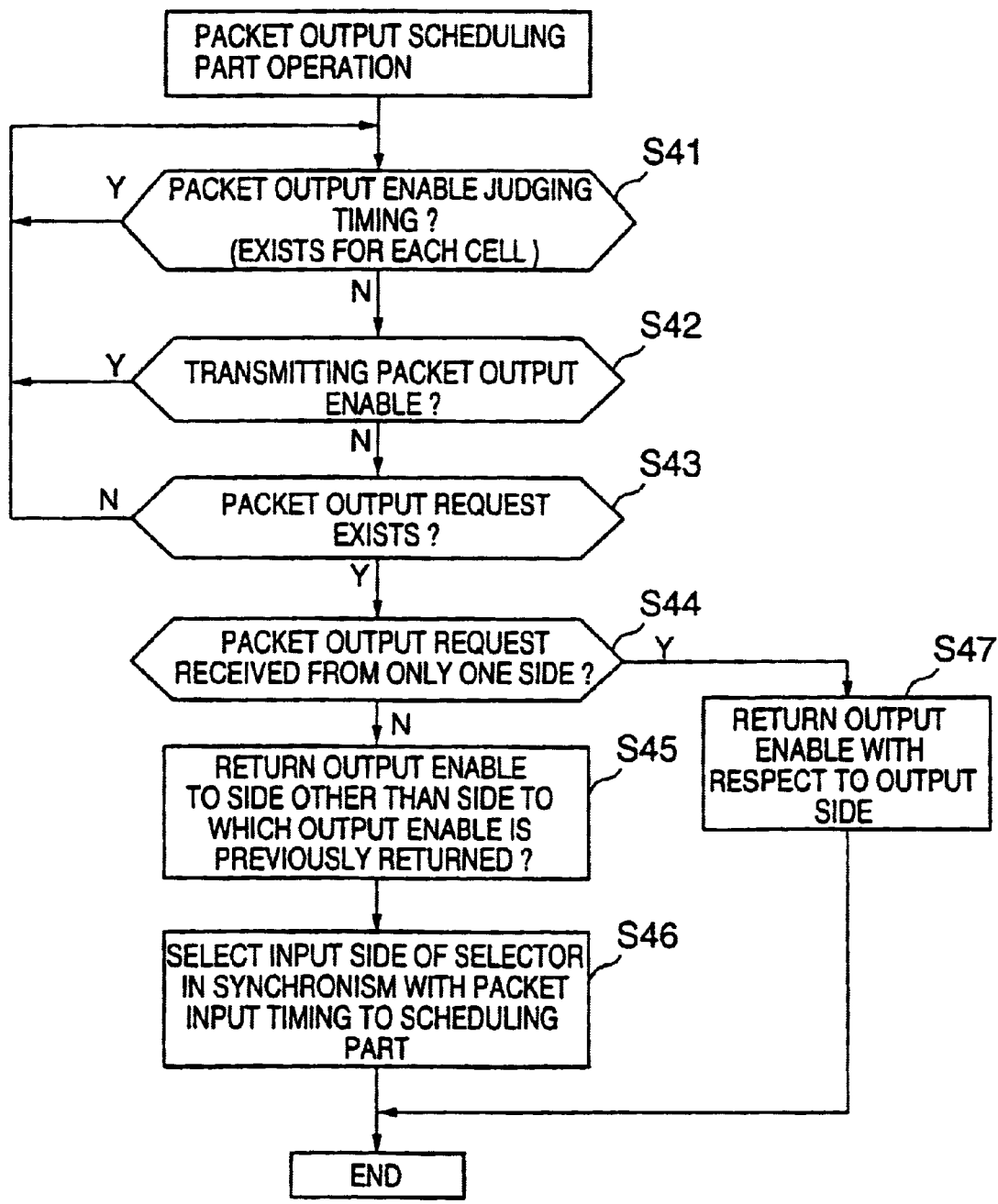
FIG. 6 is a flow chart for explaining a packet output scheduling part of the first embodiment.
Figure 7:
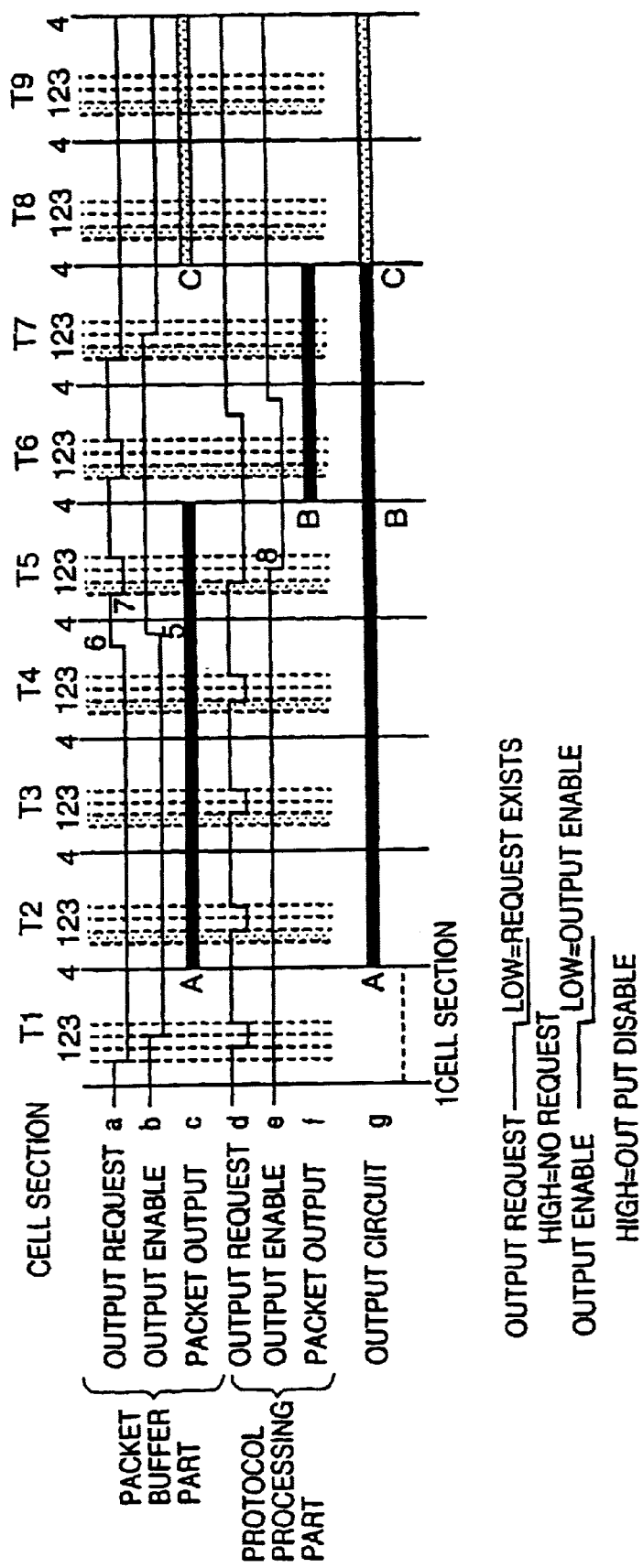
FIG. 7 is a timing chart for explaining a multiplexing operation with respect to cells from the packet buffer part and the protocol processing part of the first embodiment.

FIG. 4 is a flow chart for explaining the operation of the packet buffer part 1 of this first embodiment. FIG. 5 is a flow chart for explaining the operation of the protocol processing part 2 of this first embodiment. FIG. 6 is a flow chart for explaining the operation of the packet output scheduling part 3 of this first embodiment. In addition, FIG. 7 is a timing chart for explaining a multiplexing operation with respect to cells from the packet buffer part 1 and the protocol processing part 2 of this first embodiment.

A description of the operation of this first embodiment will now be described with reference to FIGS. 3 through 7.

When the ATM cells having the multiplexed VCs are input from the input line to the packet buffer part 1 in a step S1 shown in FIG. 4, the ATM cells are stored in the packet buffer part 11 for each of the VC numbers, maintaining the form of the cells, by the packet assembling part 13 in a step S4. At the same time, a step S2 decides whether or not the cell is a leading cell for each VC. If the decision result in the step S2 is YES, the leading cell is input to the packet type judging and header converting part 14 in a step S3 where type information which indicates whether the cell is a user cell or a protocol cell is discriminated and a corresponding new header is searched. When the search for the new header ends, the header assembling part 15 overwrites in a header storage address of a corresponding packet the new header for a next output line, at a timing when the packet assembling part 13 does not make access to the packet buffer memory 11. Information indicating the completion of the packet assembly, completion of the header assembly and completion of the packet type discrimination is input to the packet output part 16, and a step S5 decides whether or not the packet assembly is completed. The process returns to the step S1 if the decision result in the step S5 is NO. If the decision result in the step S5 is YES, a step S6 decides whether or not the packet type discrimination is completed and the header assembly is completed (that is, the search for the new header is completed). If the decision result in the step S6 is YES, a step S7 judges that the packet can be output, and registers a packet output wait queue in the FIFO memory 17.

The output arbitration part 12 monitors the packet output wait queue in the FIFO memory 17 at predetermined timings. When a packet output wait queue is stored in the FIFO memory 17, the output arbitration part 12 decides whether or not the packet output wait queue is related to a user packet in a step S8. If the packet output wait queue is related to the protocol packet and the decision result in the step S8 is NO, no output arbitration is made with the packet output scheduling part 3, and the output arbitration part 12 makes a packet output request with respect to the packet output part 16 in a step S9 so as to output the protocol packet from the packet buffer memory 11 to the protocol processing part 2 by passing through the packet output scheduling part 3, and the process ends.

On the other hand, if the packet output wait queue is related to the user packet and the decision result in the step S8 is YES, the output arbitration part 12 makes a packet output request with respect to the scheduler 31 of the packet output scheduling part 3 in a step S10. A step S11 decides whether or not an output enable response is received from the packet output scheduling part 3 in response to the packet output request from the output arbitration part 12. If an output disable response is received from the packet output scheduling part 3 and the decision result in the step S11 is NO, the output arbitration part 12 turns OFF the packet output request and re-sends the packet output request at a next output timing, in a step S12, and the process returns to the step S10. On the other hand, if the decision result in the step S11 is YES, the output arbitration part 12 obtains the user packet from the packet buffer memory 11 and outputs the user packet, and the process ends.

When the packet buffer part 1 outputs the protocol packet, the protocol packet can be output without making the output arbitration with the packet output scheduling part 3 due to the provision of the switch 30. More particularly, the switch 30 has a function of switching the user packet and the protocol packet in the packet output scheduling part 3. Normally, the switch 30 is connected to always select the CLAD part 20 of the protocol processing part 2 as the destination of the output protocol packet. However, the output user packet is recognized in advance, and the switch 30 is switched and connected to select the selector 32 of the packet output scheduling part 3 as the destination of the output user packet.

The protocol packet output from the packet buffer part 1 is input to the protocol processing part 2, and the operation shown in FIG. 5 is carried out. The CLAD part 20 of the protocol processing part 2 deletes the cell header from the ATM cells of the protocol packet in a step S21 to suit the software processing. The ATM cells deleted of the cell header are stored in a reception buffer (not shown) within the CLAD part 20, in a step S22. Thereafter, the ATM cells are stored in the buffer memory 21 on the side of the CPU 22, 1 cell at a time by DMA transfer, in a step S23. After the transfer of all of the ATM cells of the protocol packet ends, a protocol processing is made by software in a step S24. The protocol packet with respect to which the protocol processing is completed, is supplied from the buffer memory 21 to a transmission buffer (not shown) within the CLAD part 20 by DMA transfer, in a step S25, and a header is added thereto. When all of the ATM cells of the protocol packet are transferred to the transmission buffer within the CLAD part 20, the protocol packet is registered as a packet output wait queue in a step S26.

An output arbitration part (not shown) within the CLAD part 20 decides whether or not a packet output wait queue exists, in a step S27. The process ends if the decision result in the step S27 is NO. On the other hand, if the decision result in the step S27 is YES, the output arbitration part within the CLAD part 20 sends a packet output request with respect to the scheduler 31 of the packet output scheduling part 3 in a step S28, and decides in a step S29 whether or not an output enable response is thereafter received from the scheduler 31. If an output disable response is received and the decision result in the step S29 is NO, the packet output request is turned OFF, and the packet output request is sent at a next output timing, in a step S30. On the other hand, if the decision result in the step S29 is YES, the protocol packet is output from the transmission buffer within the CLAD part 20, and the protocol packet is sent to the packet output scheduling part 3, in a step S31. The process ends after the step S31. Hence, the protocol packets are subjected to the output arbitration with the scheduler 31 of the packet output scheduling part 3 in the sequence registered in the packet output wait queue, and only the protocol packet with respect to which the output enable response is received is thereafter output.

The operation shown in FIG. 6 is carried out by the packet output scheduling part 3. The scheduler 31 of the packet output scheduling part 3 includes a counter (not shown) which counts the timings within 1 ATM cell, and the packet output requests from the packet buffer part 1 and the protocol processing part 2 are monitored for each ATM cell at predetermined timing. A step S41 decides whether or not it is judged possible to output the packet at the predetermined timing. While the scheduler 31 returns the output enable response to the packet buffer part 1 or the protocol processing part 2, no judgement is made to determine whether or not the output of the packet is possible. Hence, if the decision result in the step S41 is NO, a step S42 decides whether or not the output enable response is being sent. Hence, the judgement to determine whether or not the output of the packet is possible, is made only while the output enable response is not being returned to the packet buffer part 1 or the protocol processing part 2.

If the decision result in the step S42 is NO, the scheduler 31 decides, in a step S43, whether or not a packet output request exists. If the decision result in the step S43 is YES, a step S44 decides whether or not the packet output request is received from only one of the packet buffer part 1 and the protocol processing part 2. If the decision result in the step S44 is YES, a step S47 returns the output enable response to one of the packet buffer part 1 and the protocol processing part 2 which made the packet output request, and the process ends.

On the other hand, if the decision result in the step S44 is NO, a step S45 returns the output enable response to one of the packet buffer part 1 and the protocol processing part 2 which is other than the part to which the output enable response is previously returned. In synchronism with the packet input timing to the packet output scheduling part 3, a step S46 controls the selector 32 of the packet output scheduling part 3 to select the input side which receives the user packet from the packet buffer part 1 via the switch 30 or the input side which receives the protocol packet from the protocol processing part 2 via the switch 30, depending on the output enabled side, and the process ends. As a result, the ATM cells of the packet selected by the selector 32 are output to the output line.

FIG. 7 is a timing chart for explaining a multiplexing operation with respect to ATM cells from the packet buffer part 1 and the protocol processing part 2 of the first embodiment. In FIG. 7, signals "a" through "c" are related to the packet buffer part 1, and signals "d" through "f" are related to the protocol processing part 2. More particularly, the signal "a" corresponds to the packet output request generated from the output arbitration part 12 of the packet buffer part 1, the signal "b" corresponds to the output enable response which is output from the scheduler 31 of the packet output scheduling part 3 with respect to the output arbitration part 12, and the signal "c" corresponds to the packet output from the packet buffer part 1. In addition, the signal "d" corresponds to the packet output request generated from the CLAD part 20 of the protocol processing part 2, the signal "e" corresponds to the output enable response which is output from the packet output scheduling part 3 with respect to the CLAD part 20, the signal "f" corresponds to the packet output from the CLAD part 20 with respect to the packet output scheduling part 3, and the signal "g" corresponds to the packet output to the output line from the packet output scheduling part 3. In FIG. 7, the signals "a" and "d" corresponding to the packet output requests indicate no request by a high level and indicate a request by a low level. Further, the signals "b" and "e" corresponding to the output enable responses indicate output enable by a high level, and indicate an output disable by a low level.

FIG. 7 shows 8 sections T1 through T9, and each of the sections T1 through T9 will be referred to as 1 cell section. Each cell section is made up of a plurality of timings indicated by "1", "2", "3" and "4", and the packet output request is turned ON within the timing "1". With respect to the packet output requests sent from the packet buffer part 1 and the protocol processing part 2, the packet output scheduling part 3 takes into consideration a phase error of the two requests, and carries out the output arbitration at the timing "2" with a margin of the phase error. The packet output scheduling is part 3 returns the output enable response with respect to one of the packet buffer part 1 and the protocol processing part 2 which is selected by the arbitration. A judgement is made to determine whether or not the output side of the packet output request is in the output enabled state, that is, the signal "b" or "e" corresponding to the output enable response has the low level, at the timing "3". The packet output request is turned OFF if the output side of the packet output request is not in the output enabled state, that is, is in the output disabled state.

The output side which receives the signal "b" or "e" corresponding to the output enable response, outputs the packet at the timing "4" with respect to the packet output scheduling part 3. The output enable response is turned OFF in synchronism with the turning OFF of the packet output request. For example, the signal "b" makes a transition to the high-level at a position "5" within the cell section T4 in synchronism with the signal "a" which makes a transition to the high-level at a position "6" within the cell section T4. While the output enable response is ON, the arbitration of the output enable is not carried out even at the arbitration timing, such as the timing "2". In order to continuously multiplex the packets so that no gap is formed between the packets, the timing at which the packet output request for the next output packet is set as follows.

The packet output request is reset 1 cell before the last cell of the packet is output, and the packet output request is sent again within the last cell of the packet. For example, the signal "a" corresponding to the packet output request is reset to the high level at a position "6" within the cell section T4, and the signal "a" is set again to the low level at a position "7" within the cell section T5. In addition, the output enable response is sent within the last packet. For example, the signal "e" corresponding to the output enable response makes a transition to the low level at a position "8" within the cell section T5. The side which receives the output enable response can recognize the packet output enable state before the multiplexing timing and output the next packet in accordance with this timing, and thus, it is possible to continuously carry out the multiplexing without a gap. For example, the protocol processing part 2 which receives the signal "e" corresponding to the output enable response can recognize the packet output enable state before the multiplexing timing indicated by a position "9" at a boundary between the cell sections T5 and T6, and output the next packet in accordance with this timing, so that the multiplexing can be carried out continuously without a gap as indicated by the signal "g" corresponding to the packet output to the output line from the packet output scheduling part 3.

Figure 8:
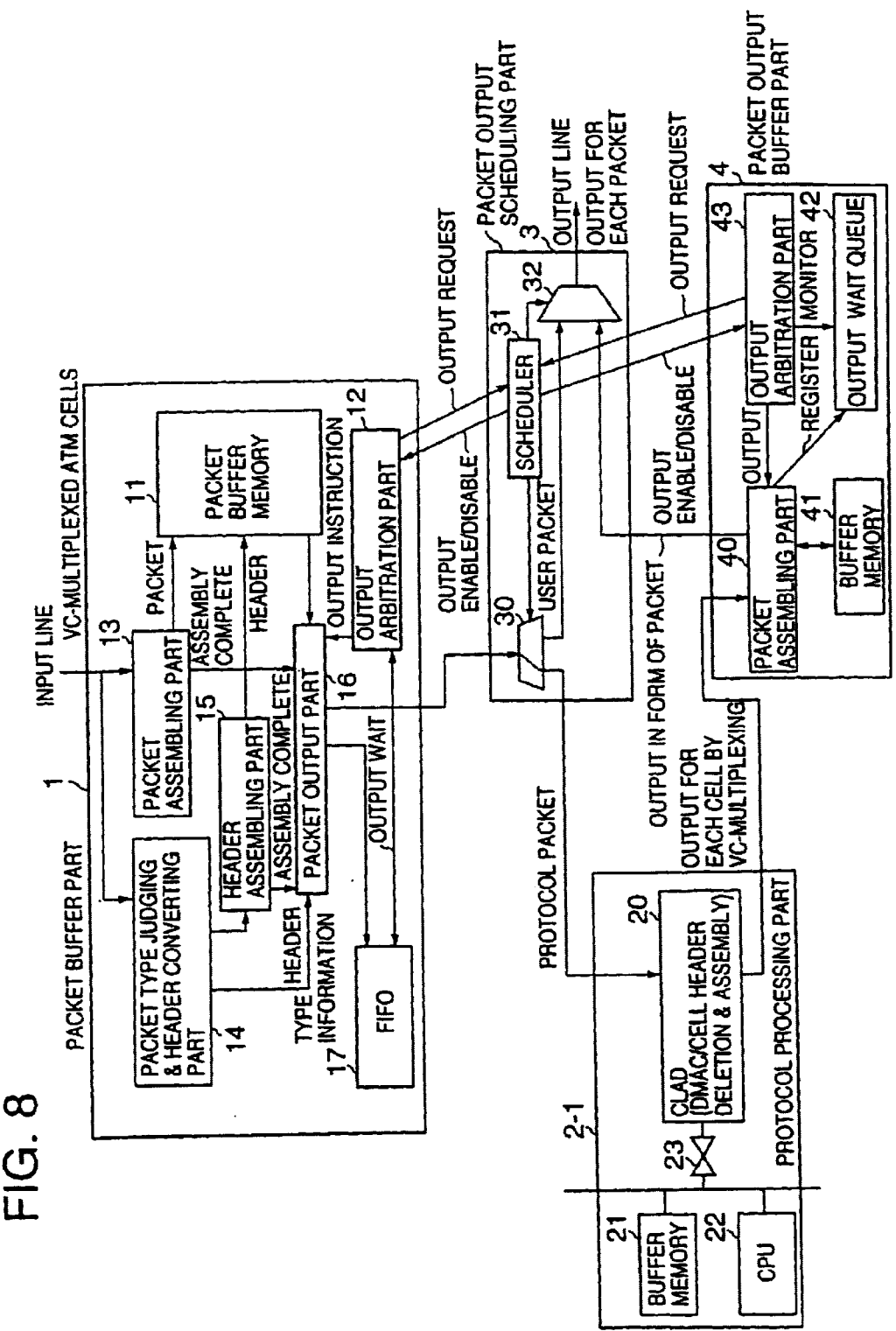
FIG. 8 is a system block diagram showing a second embodiment of the communication unit according to the present invention.

FIG. 8 is a system block diagram showing a second embodiment of the communication unit according to the present invention. In FIG. 8, those parts which are the same as those corresponding parts in FIG. 3 are designated by the same reference numerals, and a description thereof will be omitted. The constructions of the packet buffer part 1 and the packet output scheduling part 3 shown in FIG. 8 are the same as those of the first embodiment shown in FIG. 3. In addition, the buffer memory 21, the CPU 22 and the switch 23 within a protocol processing part 2-1 are the same as those shown in FIG. 3, but functions of a CLAD part 24 differ from those of the CLAD part 20 used in the first embodiment. Furthermore, a packet output buffer part 4 is additionally provided. This packet output buffer part 4 includes a packet assembling part 40, a buffer memory 41, a packet output wait queue 42, and an output arbitration part 43.

In this second embodiment, the CLAD part 24 of the protocol processing part 2-1 has a function of outputting a plurality of protocol packets in units of ATM cells with multiplexed VCs, when a software processing is carried out with respect to protocol packets corresponding to a plurality of VCs and a plurality of protocol packets waiting to be output exist in a transmission buffer (not shown) within the CLAD part 24. In other words, ATM cells corresponding to the protocol packets having different VCs are multiplexed and output instead of being multiplexed in units of the protocol packet. In contrast, the CLAD part 20 of the first embodiment multiplexes and outputs the ATM cells in units of the protocol packet.

In order to cope with this function of the CLAD part 24, the packet output buffer part 4 is provided to form the input cells into packets for each VC, similarly to the packet buffer part 1. More particularly, the packet output buffer part 4 forms each of the VC-multiplexed ATM cells output from the CLAD part 24 of the protocol processing part 2-1 into the packets for each VC. In the packet output buffer part 4, the packet assembling part 40 forms the ATM cells including the header into the packets, and stores the packets in the buffer memory 41. The completed packets are successively registered or stacked in the packet output wait queue 42. The packets stacked in the packet output wait queue 42 are subjected to an arbitration by the output arbitration part 43, with respect to the scheduler 31 of the packet output scheduling part 3. When an output enable response is returned in response to the packet output request, the packets are output to the packet output scheduling part 3 for each VC. Accordingly, even when the packets are output from the protocol processing part 2-1 in units of the VC-multiplexed ATM cells, it is possible to output the multiplexed packets to the output line.

Figure 9:
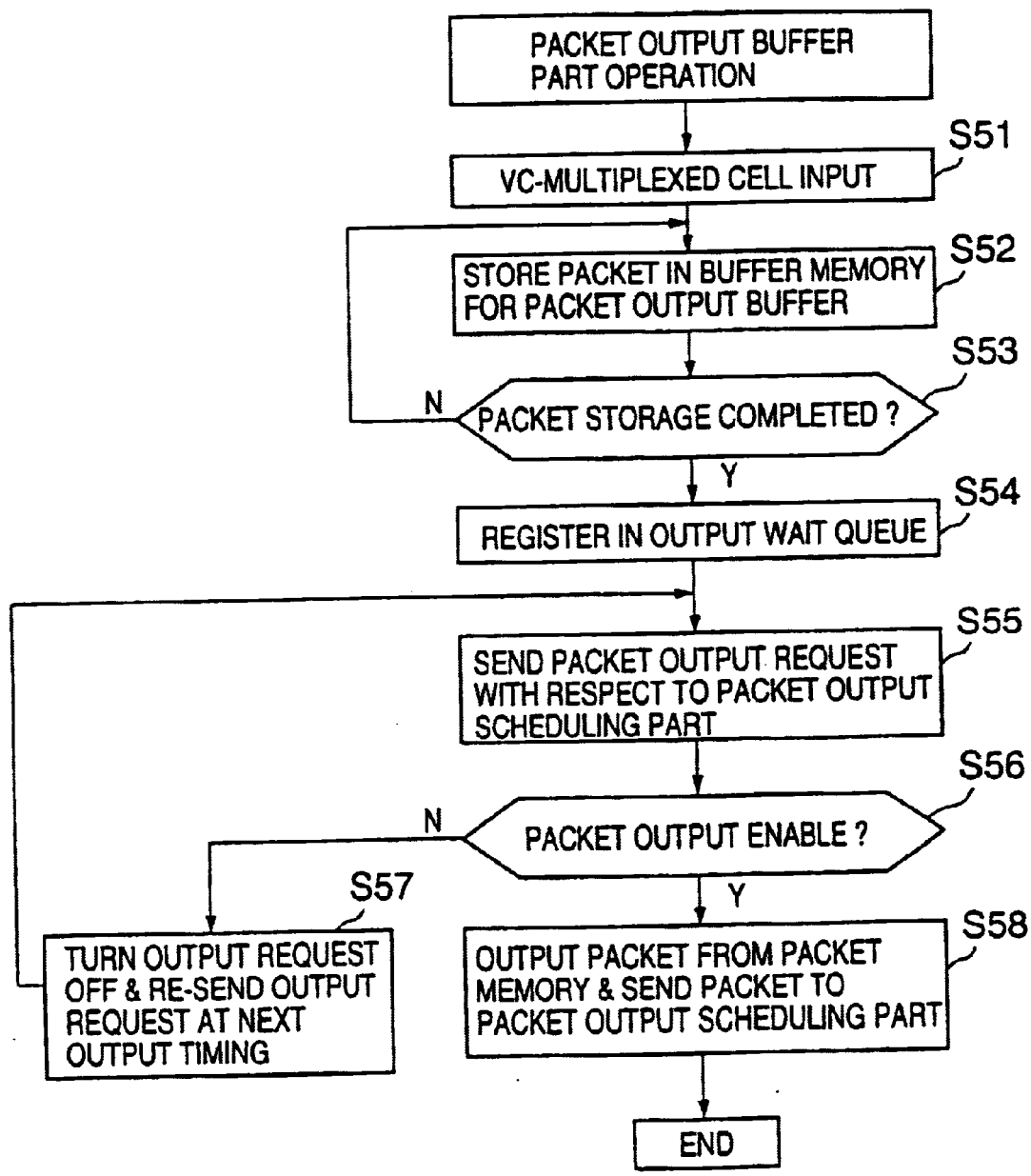
FIG. 9 is a flow chart for explaining a packet output buffer part of the second embodiment.

FIG. 9 is a flow chart for explaining the operation of the packet output buffer part 4 of the second embodiment. When the VC-multiplexed ATM cells are input from the protocol processing part 2-1 to the packet output buffer part 4 in a step S51, the packet output buffer part 4 assembles the packet in the packet assembling part 40 and stores the assembled packets in the buffer memory 41, in a step S52. Thereafter, a step S53 decides whether or not the storage of the packets is completed, and the process returns to the step S52 if the decision result in the step S53 is NO. If the decision result in the step S53 is YES, the packets are registered in the packet output wait queue 42 in a step S54, and the packet output request is sent with respect to the packet output scheduling part 3 in a step S55.

Further, a step S56 decides whether or not an output enable response is received from the packet output scheduling part 3. If an output disable response is received from the packet output scheduling part 3 and the decision result in the step S56 is NO, a step S57 turns OFF the packet output request, and re-sends the packet output request at a next output timing. On the other hand, if the decision result in the step S56 is YES, a step S58 sends the packet to the packet output scheduling part 3.

Figure 10:
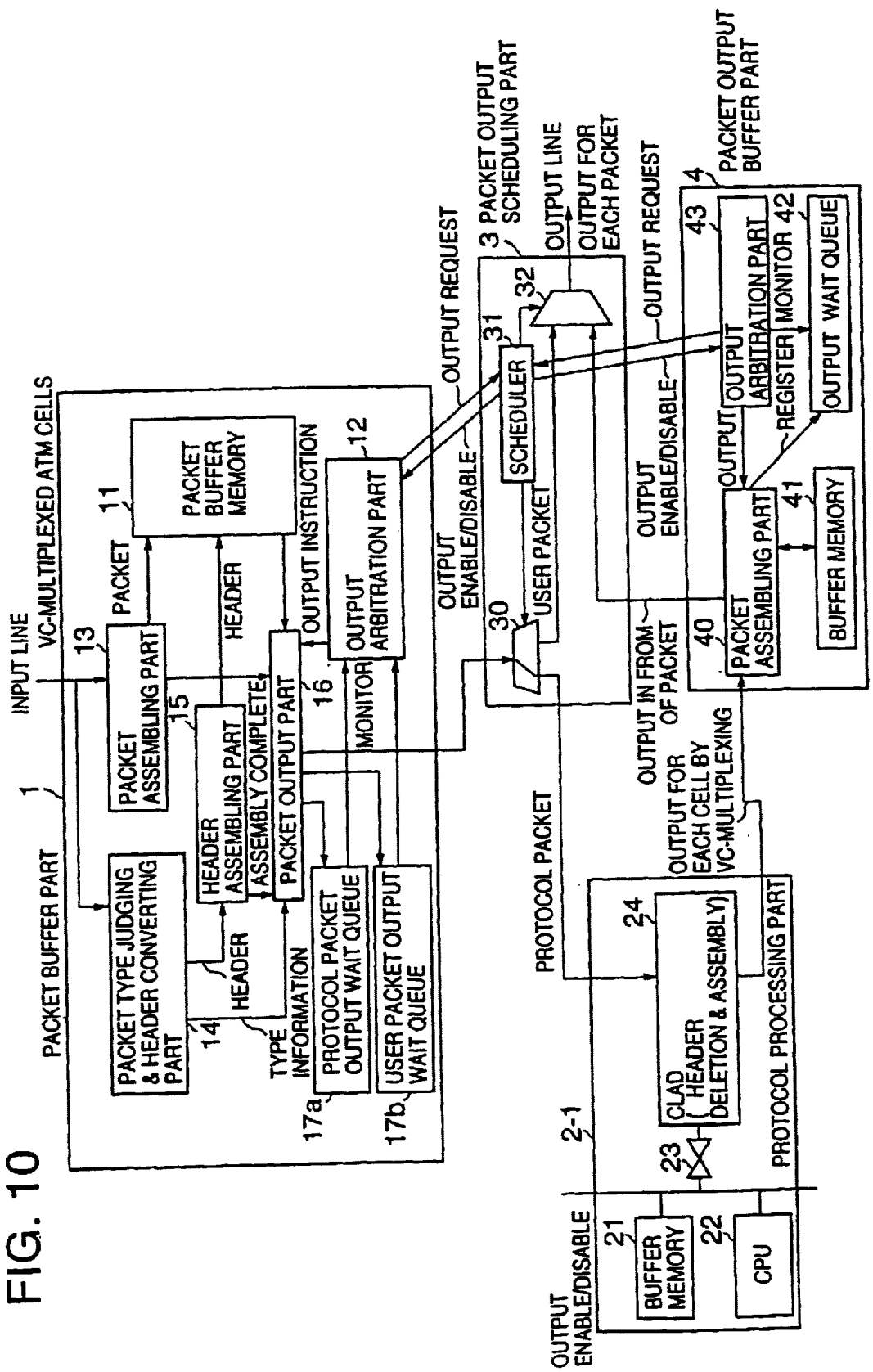
FIG. 10 is a system block diagram showing a third embodiment of the communication unit according to the present invention.

FIG. 10 is a system block diagram showing a third embodiment of the communication unit according to the present invention. In FIG. 10, those parts which are the same as those corresponding parts in FIG. 8 are designated by the same reference numerals, and a description thereof will be omitted. This third embodiment only differs from the second embodiment shown in FIG. 8 in that a packet buffer part 1-1 having a construction different from that of the packet buffer part 1 is provided. In addition to the constituent elements of the packet buffer part 1, the packet buffer part 1-1 additionally includes a protocol packet output wait queue storing part 17a, and a user packet output wait queue storing part 17b, as shown in FIG. 10. Otherwise, the construction of this third embodiment is basically the same as that of the second embodiment described above.

In FIG. 10, the packet output buffer part 4 is provided as in the second embodiment. However, it is of course possible to apply this third embodiment having the packet buffer part 1-1 to the first embodiment shown in FIG. 3 which does not have the packet output buffer part 4.

When the packet output wait queues are provided in the packet buffer part 1-1 for each packet type, the packet output part 16 within the packet buffer part 1-1 judges that it is possible to output the packet the assembly of which is completed, the packet type of which is judged and the new header of which is searched. Hence, the protocol packets are queued in the protocol packet output wait queue 17a, and the user packets are queued in the user packet output wait queue 17b. Since the number of physical output channels from the packet buffer part 1-1 is one, it is first necessary to carry out an output arbitration between the packet types and to output one of the packet types, when outputting the 2 types of packets respectively stacked in the protocol packet output wait queue 17a and the user packet output wait queue 17b.

For this reason, the output arbitration part 12 within the packet buffer part 1-1 monitors the protocol packet output wait queue 17a and the user packet output wait queue 17b at predetermined timings, and if packets are registered in the protocol packet output wait queue 17a and the user packet output wait queue 17b, the protocol packet output wait queue 17a and the user packet output wait queue 17b are alternatively selected as an output queue. The output arbitration part 12 of the packet buffer part 1-1 does not carry out an output arbitration with the packet output scheduling part 3 and passes through the packet if the protocol packet is selected as the output queue. On the other hand, the output arbitration part 12 carries out an output arbitration with the packet output scheduling part 3 if the user packet is selected as the output queue, and outputs the user packet only when the output enable response is received.

By providing the packet output wait queue for each packet type, it is possible alternately output different types of packets, independently of the packet assembling sequence, if different packet types exist.

Figure 11:
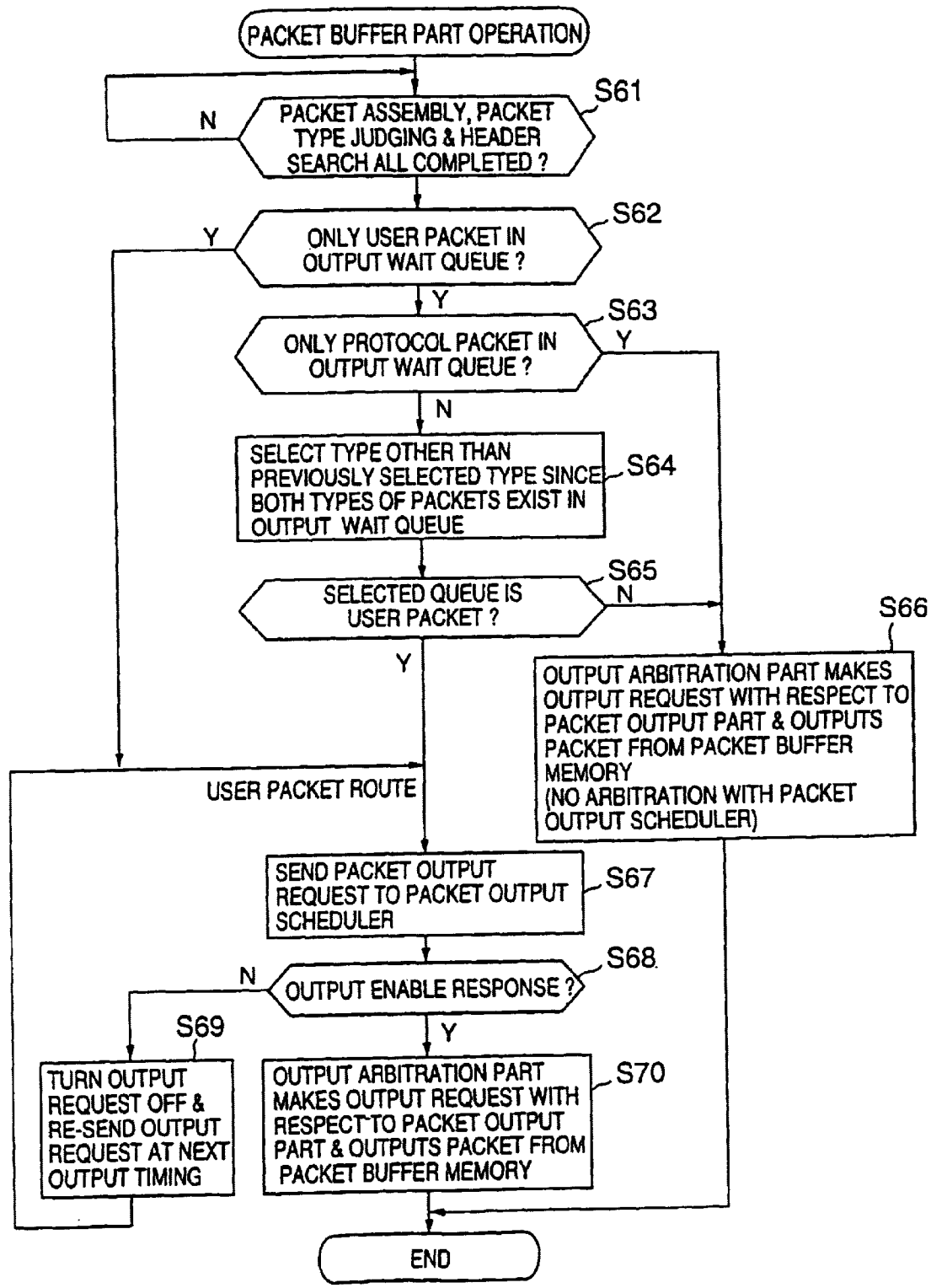
FIG. 11 is a flow chart for explaining the operation of a packet buffer part of the third embodiment.

FIG. 11 is a flow chart for explaining the operation of the packet buffer part 1-1. A step S61 decides whether or not the packet assembling is completed, the judgement of the packet type is made, and the header search is completed. If the decision result in the step S61 is YES, a step S62 decides whether or not only the user packet exists in the packet output wait queue. If only the user packet is registered in the user packet output wait queue 17b and the decision result in the step S62 is YES, the process advances to a step S67 which will be described later. On the other hand, if the decision result in the step S62 is NO, a step S63 decides whether or not only the protocol packet exists in the packet output wait queue. If only the protocol packet is registered in the protocol packet output wait queue 17a and the decision result in the step S63 is YES, the output arbitration part 12 makes a packet output request with respect to the packet output part 16 so as to output the packet from the packet buffer memory 11 in a step S66, and the process ends.

On the other hand, if the decision result in the step S63 is NO, both types of packets exist in the packet output queues. Hence, a step S64 selects the packet type which is other than the previously selected packet type, and a step S65 decides whether or not the selected packet output wait queue is the user packet output wait queue 17b. If the decision result in the step S65 is NO, the process advances to the step S66 described above.

If the selected packet output wait queue is the protocol packet output wait queue 17a and the decision result in the step S65 is YES, a step S67 sends a packet output request to the packet output scheduler 31. A step S68 decides whether or not an output enable response is returned in response to the packet output request. If the decision result in the step S68 is NO, a step S69 turns OFF the packet output request, re-sends the packet output request at a next output timing, and the process returns to the step S67. On the other hand, if the decision result in the step S68 is YES, the output arbitration part 12 makes a packet output request with respect to the packet output part 16 so as to output the packet from the packet buffer memory 11 in a step S70, and the process ends.

Figure 12:
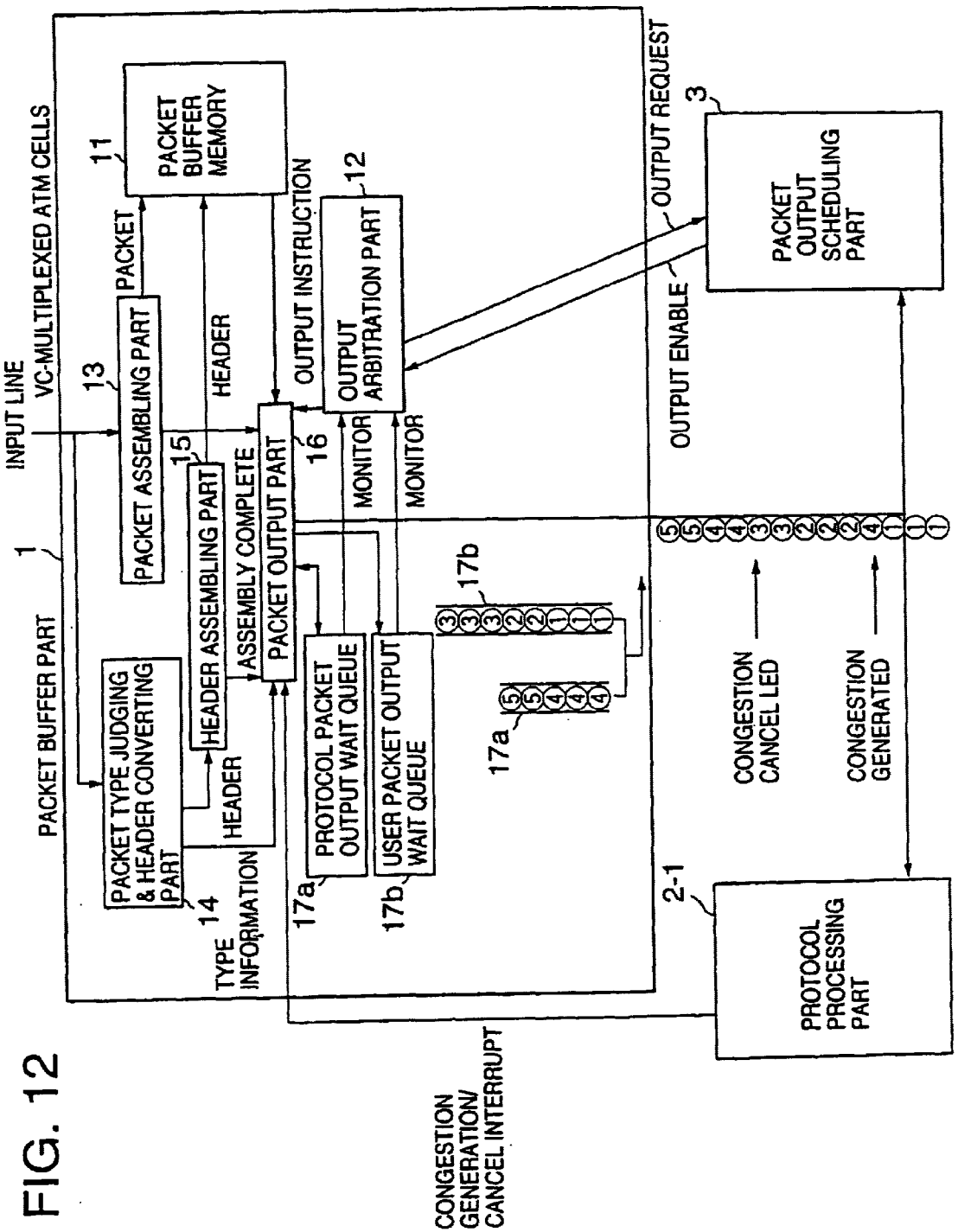
FIG. 12 is a system block diagram showing a fourth embodiment of the communication unit according to the present invention.

FIG. 12 is a system block diagram showing a fourth embodiment of the communication unit according to the present invention. In FIG. 12, those parts which are the same as those corresponding parts in FIG. 10 are designated by the same reference numerals, and a description thereof will be omitted. In the third embodiment described above, the processing speed of the protocol processing software of the protocol processing part 2 is slower than the input line speed of the protocol packet, and there is a possibility of a buffer overflow or the like being generated due to a congestion at the buffer of the protocol processing part 2. This fourth embodiment is constructed to positively prevent such a buffer overflow or the like caused by the congestion.

In FIG. 12, the illustration of the internal construction of the protocol processing part 2-1 is omitted since the internal construction is basically the same as that of the third embodiment shown in FIG. 10. However, in this fourth embodiment, a congestion generation/cancel interrupt signal 25 is output from the CPU 22 of the protocol processing part 2-1 to the packet output part 16 of the packet buffer part 1-1. Further, although the packet output buffer part 4 of the second and third embodiments shown in FIGS. 8 and 10 is not provided in this fourth embodiment shown in FIG. 12, it is of course apply this fourth embodiment to the case where the packet output buffer part 4 is provided.

Figure 13A:
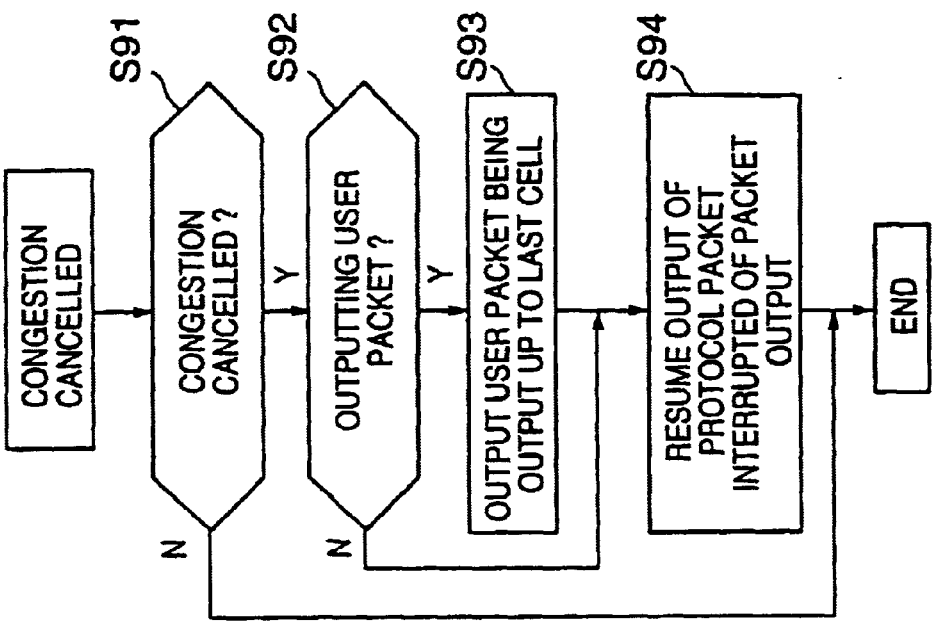
FIGS. 13A and 13B respectively are flow charts for explaining a congestion in the fourth embodiment.
Figure 13B:
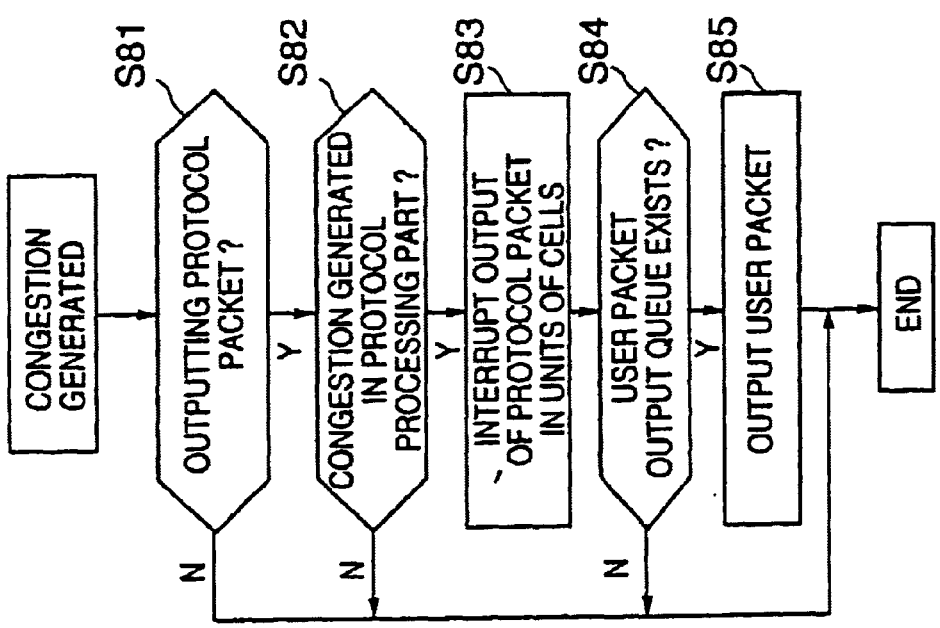

FIGS. 13A and 13B respectively are flow charts for explaining a congestion control in this fourth embodiment. FIG. 13A is a flow chart for explaining the congestion control when the congestion is generated, and FIG. 13B is a flow chart for explaining the congestion control when the congestion is cancelled.

A description of this fourth embodiment will now be described with reference to FIGS. 12, 13A and 13B.

In the protocol processing part 2-1, because the processing speed of the protocol processing software is slower than the input line speed of the protocol packet, an empty region of the buffer within the protocol processing part 2-1 is monitored. If the size of the empty region of the buffer becomes less than or equal to a predetermined threshold value, the congestion generation interrupt signal 25 is generated and is supplied to the packet output part 16 of the packet buffer part 1-1.

The packet output part 16 of the packet buffer part 1-1 starts a process shown in FIG. 13A in response to the congestion generation interrupt signal 25. A step S81 decides whether or not a protocol packet is being output, and the process ends if the decision result in the step S81 is NO. If the decision result in the step S81 is YES, a step S82 decides whether or not the congestion is generated in the protocol processing part 2-1, based on the congestion generation/cancel interrupt signal 25, and the process ends if the decision result in the step S82 is NO. If the decision result in the step S82 is YES, a step S83 immediately interrupts the packet output in units of cells, and a step S84 decides whether or not a user packet output wait queue 17b exists. The process ends if the decision result in the step S84 is NO. On the other hand, if the decision result in the step S84 is YES, a step S85 outputs the user packet by giving the output right to the user packet output wait queue 17b, and the process ends.

The output right is unconditionally given to the user packet output wait queue 17b until the congestion is cancelled. When the congestion is cancelled and the congestion cancel interrupt signal 25 is generated, the packet output part 16 of the packet buffer part 1-1 starts a process shown in FIG. 13B. A step S91 decides whether or not the congestion is cancelled, based on the congestion cancel interrupt signal 25, and the process ends if the decision result in the step S91 is NO. If the decision result in the step S91 is YES, a step S92 decides whether or not a user packet is being output. If the decision result in the step S92 is YES, a step S93 outputs all of the cells up to the last cell of the user packet which is being output. If the decision result in the step S92 is NO or after the step S93, a step S94 resumes output of a cell of a protocol packet the output of which was interrupted, and the process ends.

FIG. 12 shows the packet (cell) output operation for a case where the congestion is generated and the congestion is thereafter cancelled. In this particular case shown, 2 protocol packets respectively made up of a plurality of cells ④ and ⑤ are stored in the protocol packet output wait queue 17a of the packet buffer part 1-1, and 3 user packets respectively made up of cells ①, ② and ③ are stored in the user packet output wait queue 17b of the packet buffer part 1-1. In this state, after the user packet made up of the cells ①, ① and ① is output from the user packet output wait queue 17b to the packet output scheduling part 3, the congestion is generated when 1 cell ④ of the protocol packet is output. In this case, the output of the protocol packet is interrupted, and the cells ② and ③ of the user packet are output as shown in FIG. 12. In other words, the cancellation of the congestion is notified after 3 cells ② of the user packet are output and 1 cell ③ of the next user packet is output. Hence, after the second cell ③ of this next user packet is output, the output is switched to the output of the cells ④ of the protocol packet, and the cells ⑤ of the next protocol packet are output successively.

Therefore, it is possible to suppress the output of the protocol packet in units of cells by carrying out the congestion control described above. While the output of the protocol packet is suppressed simultaneously as the prevention of the buffer congestion, it is possible to output the user packet so as to effectively utilize the line.

Figure 14:
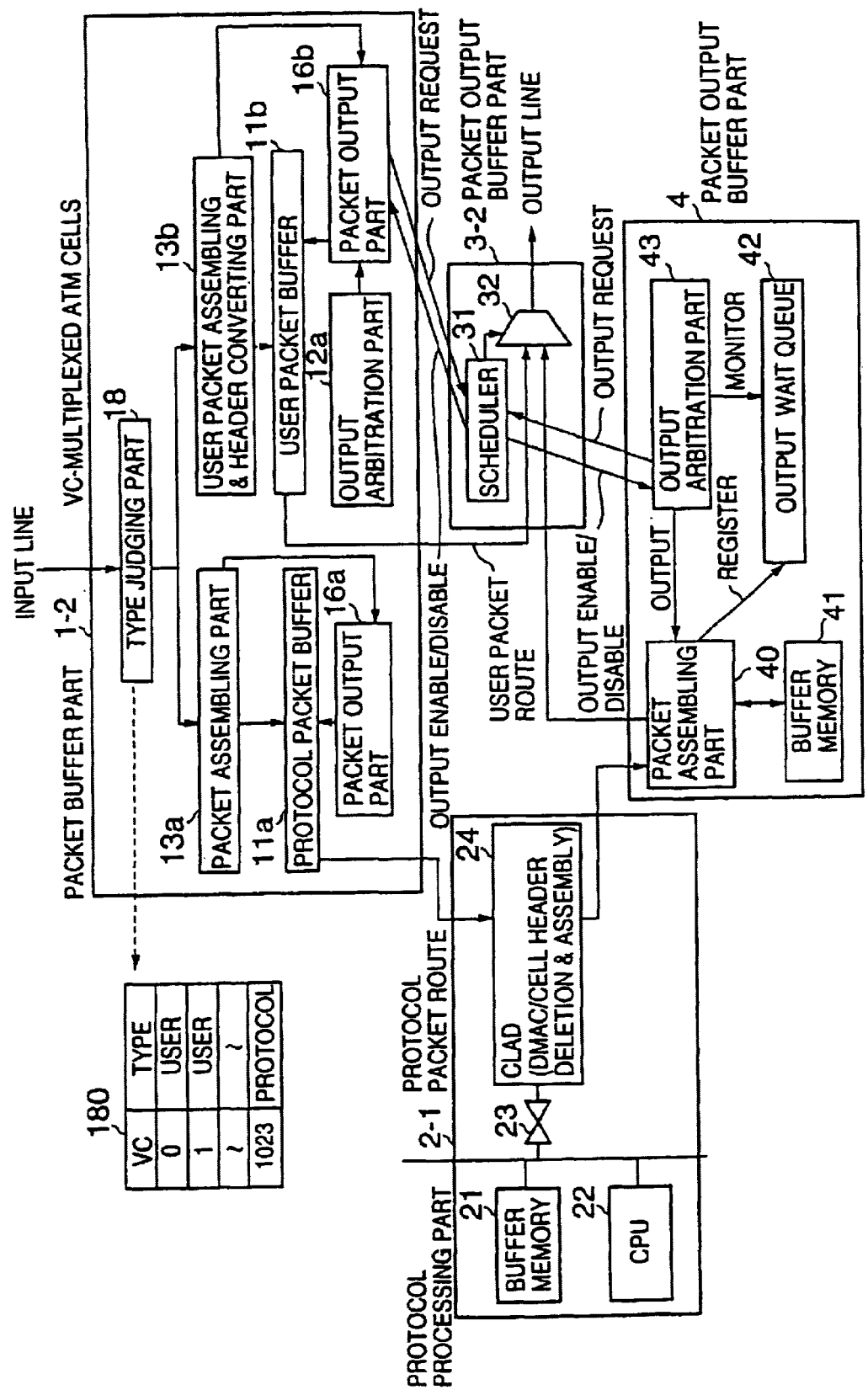
FIG. 14 is a system block diagram showing a fifth embodiment of the communication unit according to the present invention.

FIG. 14 is a system block diagram showing a fifth embodiment of the communication unit according to the present invention. In FIG. 14, those parts which are the same as those corresponding parts in FIGS. 8 and 10 are designated by the same reference numerals, and a description thereof will be omitted. In this fifth embodiment, the packet type is first discriminated when the cells of the packet are received, and independent structures are used to carry out the processes of assembling the packet, buffering the packet and outputting the packet, with respect to the protocol packet and the user packet.

In this fifth embodiment, a packet buffer part 1-2 and a packet output scheduling part 3-2 shown in FIG. 14 have structure different from those of the second and third embodiments described above in conjunction with FIGS. 8 and 10.

The packet buffer part 1-2 includes a protocol packet buffer 11a, a user packet buffer 11b, a user packet output arbitration part 12a, a protocol packet assembling part 13a, a user packet assembling and header converting part 13b, a protocol packet output part 16a, a user packet output part 16b, and a type discriminating part 18 which includes a storage part 180 for storing the packet type for each VC.

In FIG. 14, the packet output buffer part 4 is provided as in the second embodiment. However, it is of course possible to apply this fifth embodiment having the packet buffer part 1-2 and the packet output scheduling part 3-2 to the first embodiment shown in FIG. 3 which does not have the packet output buffer part 4.

In this fifth embodiment shown in FIG. 14, the VC-multiplexed ATM cells are input to the type discriminating part 18 of the packet buffer part 1-2, wherein the kind of leading cell, that is, the protocol packet or the user packet, is discriminated from the value of the VC within the header. The VC number and the discriminated kind of cell, that is, the discriminated packet type, are stored in the storage part 180 of the type discriminating part 18. The cells are distinguished based on the result of discrimination made in the type discriminating part 18, and the cells of the protocol packet and the cells of the user packet are stored independently. More particularly, the cells of the protocol packet are stored in the protocol packet output part 16a in the form of the protocol packet, by the protocol packet assembling part 13a which are provided exclusively for the protocol packet. On the other hand, the cells of the user packet are stored in the user packet output part 16b in the form of the user packet, by the user packet assembling and header converting part 13b which are provided exclusively for the user packet.

The protocol packets are output to the protocol processing part 2-1 in the sequence in which the assembly of the protocol packet is completed, and the protocol packets are thereafter processed similarly as in the second embodiment described above in conjunction with FIG. 8. The protocol packet is multiplexed with the user packet by the packet output scheduling part 3-2 and output to the output line. On the other hand, with respect to the user packets, the output arbitration part 12a carries out an arbitration with the packet output scheduling part 3-2, similarly to the arbitration carried out by the output arbitration part 12 of the first embodiment described above in conjunction with FIG. 3. The user packet is multiplexed with the protocol packet by the packet output scheduling part 3-2 and output to the output line.

According to this fifth embodiment, the packet type of the input cells is first discriminated, and the subsequent processing is carried out by independent routes depending on the discriminated packet type. For this reason, it is possible to output the packets without being affected by the output sequence of the packet types.

Figure 15:
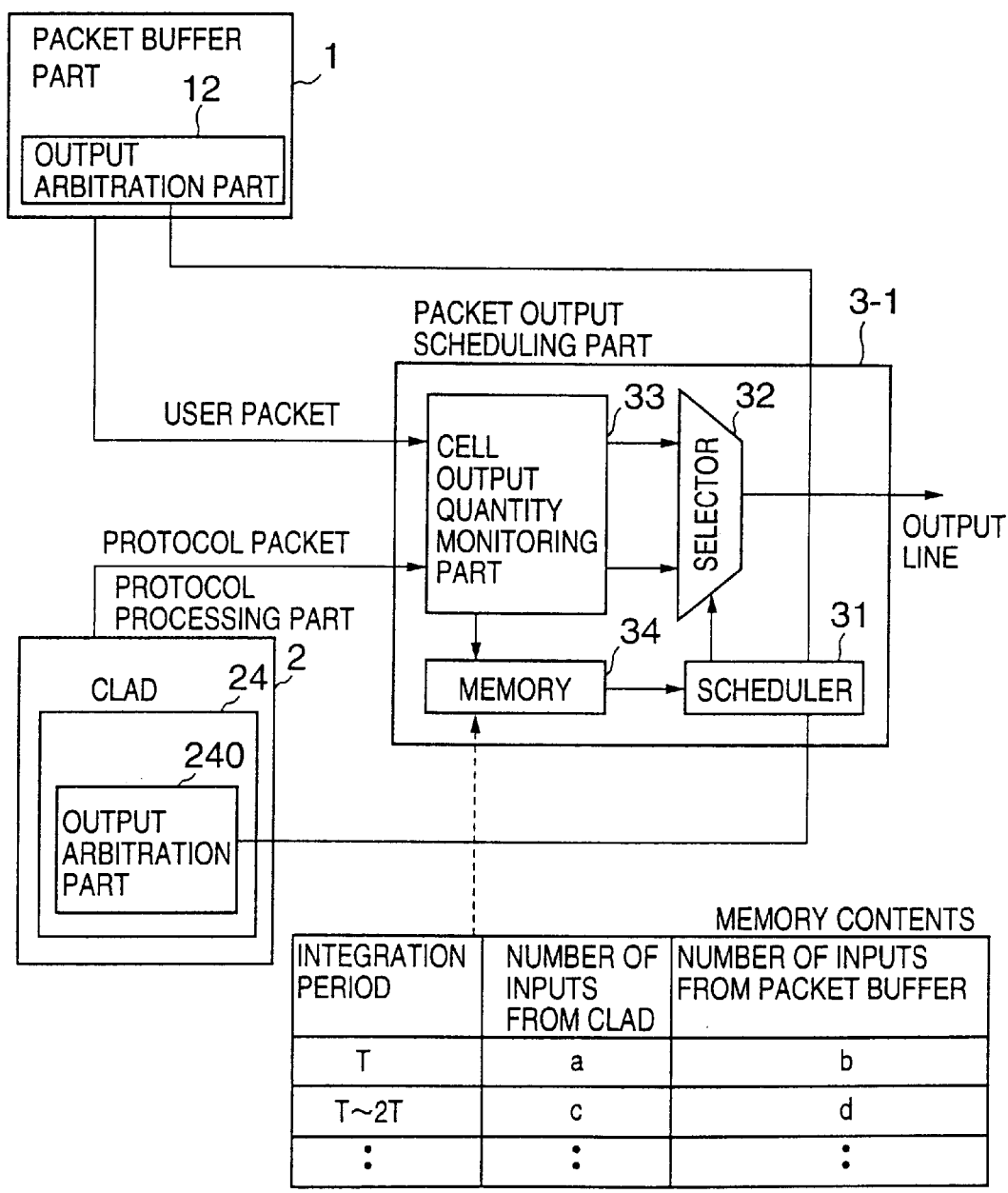
FIG. 15 is a diagram for explaining a sixth embodiment of the communication unit according to the present invention.

FIG. 15 is a system block diagram showing a sixth embodiment of the communication unit according to the present invention. In FIG. 15, those parts which are the same as those corresponding parts in FIG. 3 are designated by the same reference numerals, and a description thereof will be omitted. In this sixth embodiment, the output of the protocol packet and the user packet to the output line is efficiently carried out by a packet output scheduling part 3-1, so as to prevent a buffer congestion.

A communication unit shown in FIG. 15 generally includes the packet buffer part 1, the protocol processing part 2, and the packet output scheduling part 3-1. The packet buffer part 1 includes the output arbitration part 12, and although the illustration of other parts of the packet buffer part 1 is omitted, the construction of the other parts of the packet buffer part 1 may be the same as that of the first embodiment shown in FIG. 3. The protocol processing part 2 includes the CLAD part 24 which includes an output arbitration part 240, and although the illustration of other parts of the protocol processing part 2 is omitted, the construction of the other parts of the protocol processing part 2 may be the same as that of the first embodiment shown in FIG. 3.

The packet output scheduling part 3-1 includes the scheduler 31, the selector 32, a cell output quantity monitoring part 33 and a memory 34 which are connected as shown in FIG. 15.

Of course, this sixth embodiment may also be applied to a case where the packet output buffer part 4 is provided as in the second embodiment shown in FIG. 8 or the third embodiment shown in FIG. 10.

In this sixth embodiment, the cell output quantity monitoring part 33 of the packet output scheduling part 3-1 monitors the number of input cells at an integration period T from the CLAD part 24 of the protocol processing part 2 and the packet buffer part 1, and stores the number of input cells in the memory 34. FIG. 15 shows a case where the memory contents of the memory 34 indicate that a number "a" of input cells from the CLAD part 24 of the protocol processing part 2 is monitored and a number "b" of input cells from the packet buffer part 1 is monitored during a first integration period T, and a number "c" of input cells from the CLAD part 24 of the protocol processing part 2 is monitored and a number "d" of input cells from the packet buffer part 1 is monitored during a next integration period from T to 2T.

The scheduler 31 reads the memory contents of the memory 34, and obtains a ratio A of the numbers of input cells between the protocol processing part 2 and the packet buffer part 1 during the integration period T (from 0 to T), where A=a/b in this particular case. When there is contention between the output request from the protocol processing part 2 and the packet buffer part 1 during the next integration period T (from T to 2T), the ratio A is used by the scheduler 31 as a ratio with which the output enable responses are returned to the protocol processing part 2 and the packet buffer part 1.

If the ratio of the number of input cells between the protocol processing part 2 and the packet buffer part 1 during the next integration period T from T to 2T falls within a range $A^2 \pm 10\%$, it is judged that one of the packet buffer part 1 and the protocol processing part 2 which is put into the packet output enable state with priority over the other further received a number of input cells amounting to the proportion of the output requests received with priority in addition to the original number of input cells, and the ratio A is used as an output enable ratio at the time of the contention during a next integration period T from 2T to 3T. On the other hand, if the ratio of the number of input cells between the protocol processing part 2 and the packet buffer part 1 during the integration period T from T to 2T falls outside the range $A^2 \pm 10\%$, the output enable ratio during the next integration period T from 2T to 3T is set to A/B which is a product of an inverse number of a ratio B of the number of input cells and the output enable ratio A during the integration period T from T to 2T.

The deviation ratio of the output requests are obtained similarly for the integration periods T subsequent to 3T. The range $A^2 \pm 10\%$ may be always set by software, for example. According to this sixth embodiment, one of the packet buffer part 1 and the protocol processing part 2 having the larger number of cell outputs is given the priority over the other to output the packets, and consequently, it is possible to prevent the buffer congestion in the packet buffer part 1 caused by a burst traffic or the like.

Therefore, according to the present invention, it is possible to discriminate the packet type in parallel with the operation of forming the packets, with respect to the VC-multiplexed ATM cells which are input. Furthermore, it is also possible to carry out the header conversion. Hence, it is possible to reduce the effects of the processing delay caused by the packet type discrimination and switch the packet output, and the processing delay associated with the header conversion can also be reduced.

In addition, by separating the protocol packet and the user packet, it is possible to output the user packet by passing through the user packet on one hand, while processing the protocol packet by software on the other, so that the protocol packet and the user packet can be multiplexed. Hence, the user packet is unaffected by the software processing delay of the protocol packet, and it is possible to improve the throughput of the user packet as compared to the conventional communication unit.

Moreover, by providing a mechanism which suppresses the output of the protocol packet when the size of the empty buffer region within a protocol processing part becomes less than or equal to a predetermined threshold value, and separates the output queues for the protocol packet and carries out a congestion control so that the user packet is output with priority, it is possible to suppress the output of the protocol packet in units of cells when the congestion occurs. As a result, packet loss is prevented, and the utilization efficiency of the line is improved by outputting the user packet while the output of the protocol packet is suppressed.

In addition, by carrying out the output arbitration between a packet buffer part and a packet output scheduling part and between the protocol processing part and the packet output scheduling part at the timing of the last cell, it is possible to continuously multiplex the user packet and the protocol packet. Even when multiplexing different packet types, it is possible to efficiently utilize the line without generating a gap.

On the other hand, by enabling the packet output scheduling part to carry out the scheduling by taking into consideration the number of sending cells depending on the packet type, it is possible to prevent the buffer congestion with respect to both packet types, and cell loss can be prevented.

Accordingly, the present invention can carry out the processes of forming the packet from the cells, converting the header and processing the protocol at a high speed, and also sufficiently utilize the line rate. For this reason, the present invention is particularly effective when applied to a unit which is used in an internet network in which large amounts of header conversion and protocol processings are made and the data are exchanged in units of packets. Thus, the present invention can cope with the continuously increasing internet demands, and increase the speed of the line as well as enable efficient use of the line.

Further, the present invention is not limited to these embodiments, but various variations and modifications may be made without departing from the scope of the present invention.

What is claimed is:

1. An apparatus comprising:
   a packet buffer part receiving Virtual Channel (VC)-multiplexed packets from an input line, judging a packet type, converting a header and assembling a packet;
   a protocol processor receiving and processing a protocol packet output from said packet buffer part when the packet type of the packet assembled in said packet buffer part is the protocol packet; and
   a packet output scheduler which carries out an arbitration in response to a reception of a user packet from said packet buffer part and an ending of a process from said protocol processor, and selects and outputs to an output line the user packet or the protocol packet based on the arbitration.

2. The apparatus as claimed in claim 1, wherein said packet buffer part comprises:
   a packet type judging and head converting part which detects a leading cell, judges the packet type and converts the header;
   a packet buffer memory;
   a packet assembling part which stores the packet in said packet buffer memory;
   a header assembling part which assembles a new header and stores the new header in said packet buffer memory;
   a packet output part which queues the packet in a packet output wait queue when the packet assembling is completed and a packet output enable state is detected; and
   an output arbitration part which monitors the packer output wait queue and carries out a control to output the packet to said protocol processor or said packet output scheduler.

3. The apparatus as claimed in claim 2, wherein said output arbitration part judges the packet type of the packet output wait queue at predetermined timings,
   said output arbitration part carrying out no output arbitration with said packet output scheduler if the judged packet type of the packet output wait queue is the protocol packet, and passing through and outputting the protocol packet from said packet buffer memory to said protocol processor,
   said output arbitration part sending a packet output request with respect to said packet output scheduler if the judged packet type of the packet output wait queue is the user packet and outputting the user packet to said packet output scheduler when an output enable response is received from said packet output scheduler.

4. The apparatus as claimed in claim 1, which further comprises:
   a packet output buffer part including a mechanism which outputs VC-multiplexed ATM cells when a software processing of said protocol processor ends, and inputting ATM cells output from said protocol processor,
   said packet output buffer part including a packet assembling part which assembles a packets from the ATM cells, generating a packet output request with respect to said packet output scheduler when the packet assembling ends, and outputting the assembled packet when an output enable response is received in response to the packet output request.

5. The apparatus as claimed in claim 4, wherein said packet buffer Dart comprises:
   storing means for independently storing packet output wait queues for the protocol packet and the user packet,
   said packet output buffer part alternately selecting and outputting the protocol packet and the user packet from said storing means when the packet output wait queues for the protocol packet and the user packet are stored in said storing means.

6. The apparatus as claimed in claim 5, which further comprises:
   a signal line transmitting a congestion notification which notifies a generation of a congestion from said protocol processor to said packet buffer part,
   said packet buffer part interrupting output of the protocol packet from said packet buffer to part said protocol processor in response to the congestion identification notification from said signal line and outputting the user packet.

7. The apparatus as claimed in claim 2, wherein said packet buffer part further comprises:
   storing means for independently storing packet output wait queues for the protocol packet and the user packet,
   said packet output part alternately selecting and outputting the protocol packet and the user packet from said storing means when the packet output wait queues for the protocol packet and the user packet are stored in said storing means.

8. The apparatus as claimed in claim 7, which further comprises:
   a signal line transmitting a congestion notification which notifies a generation of a congestion from said protocol processor to said packet buffer part,
   said packer buffer part interrupting output of the protocol packet from said packet buffer part to said protocol processor in response to the congestion notification from said signal line and outputting the user packet.

9. The apparatus as claimed in claim 1, wherein said packet output scheduler comprises:
   a cell output quantity monitoring part which counts a number of cells of the user packet from said packet buffer and a number of cells of the protocol packet from said protocol processor at predetermined periods; and
   a memory which stores a monitored result of said cell output quantity monitoring part,
   said scheduler controlling a ratio of selected user packets and protocol packets for every period, by using a ratio of the number of cells of the protocol packet and the number of cells of the user packet stored in said memory.

10. A communication unit which transmits packets in the form of ATM cells, comprising:
    a packet buffer part receiving Virtual Channel (VC)-multiplexed ATM cells from an input line, judging a packet type, converting a header and assembling a packet;
    a protocol processing part receiving and processing a protocol packet output from said packet buffer part when the packet type of the packet assembled in said packet buffer part is the protocol packet which is used for communication control; and
    a packet output scheduling part, including a scheduler which carries out an arbitration when an output request generated upon completion of a reception of a user packet from said packet buffer part and an output request generated upon ending of a process from said protocol processing part are received, and selects and outputs to an output line the user packet or the protocol packet based on the arbitration.

11. The communication unit as claimed in claim 10, wherein said packet buffer part comprises:
    a packet type judging and head converting part which detects a leading cell, judges the packet type and converts the header;
    a packet buffer memory;
    a packet assembling part which stores the packet in said packet buffer memory;
    a header assembling part which assembles a new header and stores the new header in said packet buffer memory;
    a packet output part which queues the packet in a packet output wait queue when the packing assembling is completed and a packet output enable state is detected; and an output arbitration part which monitors the packet output wait queue and carries out a control to output the packet to said protocol processing part or said packet output scheduling part.

12. The communication unit as claimed in claim 11, wherein said output arbitration part judges the packet type of the packet output wait queue at predetermined timings, said output arbitration part carrying out no output arbitration with said packet output scheduling part if the judged packet type of the packet output wait queue is the protocol packet and passing through and outputting the protocol packet from said packet buffer memory to said protocol processing part, said output arbitration part sending a packet output request with respect to said packet output scheduling part if the judged packet type of the packet output wait queue is the user packet, and outputting the user packet to said packet output scheduling part when an output enable response is received from said packet output scheduling part.

13. The communication unit as claimed in claim 10, which further comprises:

a packet output buffer part including a mechanism which outputs VC-multiplexed ATM cells when a software processing of said protocol processing part ends, and inputting ATM cells output from said protocol processing part, said packet output buffer part including a packet assembling part which assembles a packets from the ATM cells, generating a packet output request with respect to said packet output scheduling part when the packet assembling ends, and outputting the assembled packet when an output enable response is received in response to the packet output request.

14. The communication unit as claimed in claim 13, wherein said packet buffer part comprises:

storing means for independently storing packet output wait queues for the protocol packet and the user packet, said packet output buffer part alternately selecting an outputting the protocol packet and the user packet from said storing means when the packet output wait queues for the protocol packet and the user packet are stored in said storing means.

15. The communication unit as claimed in claim 14, which further comprises:

a signal line transmitting a congestion notification which notifies a generation of a congestion from said protocol processing part to said packet buffer part, said packet buffer part interrupting output of the protocol packet from said packet buffer part to said protocol processing part in response to the congestion notification from said signal line and outputting the user packet.

16. The communication unit as claimed in claim 11, wherein said packet buffer part further comprises:

storing means for independently storing packet output wait queues for the protocol packet and the user packet, said packet output part alternately selecting and outputting the protocol packet and the user packet from said storing means when the packet output wait queues for the protocol packet and the user packet are stored in said storing means.

17. The communication unit as claimed in claim 16, which further comprises:

a signal line transmitting a congestion notification which notifies a generation of a congestion from said protocol processing part to said packet buffer part, said packet buffer part interrupting output of the protocol packet from said packet buffer part to said protocol processing part in response to the congestion notification from said signal line and outputting the user packet.

18. The communication unit as claimed in claim 10, wherein said packet output scheduling part comprises:

a cell output quantity monitoring part which counts a number of cells of the user packet from said packet buffer part and a number of cells of the protocol packet from said protocol processing part at predetermined periods; and a memory which stores a monitored result of said cell output quantity monitoring part, said scheduler controlling a ratio of selected user packets and protocol packets for every period, by using a ratio of the number of cells of the protocol packet and the number of cells of the user packet stored in said memory.

19. A communication unit which transmits packets in the form of ATM cells, comprising:

a packet buffer part receiving Virtual Channel (VC)-multiplexed ATM cells from an input line;

a packet output scheduling part having a scheduler; and a protocol processing part, said packet buffer part including a packet type judging part judging a packet type of the received ATM cells, first and second packet assembling parts assembling a packet from the received ATM cells, first and second packet buffer parts, and first and second packet output parts, said first packet assembling part, said first packet buffer part and said first packet output part being provided with respect to a protocol packet, said second packet assembling part, said second packet buffer part and said second packet output part being provided with respect to a user packet, said first packet output part outputting the protocol packet with respect to said protocol processing part, said second packet output part having an output arbitration part which carries out an arbitration between the scheduler of said packet output scheduling part and outputting the user packet to said packet output scheduling part, said protocol processing part outputting the protocol packet to said packet output scheduling part when a software processing of the protocol packet ends.

20. The communication unit as claimed in claim 19, wherein said packet output scheduling part comprises:

a cell output quantity monitoring part which counts a number of cells of the user packet from said packet buffer part and a number of cells of the protocol packet from said protocol processing part at predetermined periods; and a memory which stores a monitored result of said cell output quantity monitoring part, said scheduler controls a ratio of selected user packets and protocol packets for every period, by using a ratio of the number of cells of the protocol packet and the number of cells of the user packet stored in said memory.

* * * * *